United States Patent
Barger et al.

(10) Patent No.: US 7,264,678 B2
(45) Date of Patent: Sep. 4, 2007

(54) PROCESS FOR CLEANING A SURFACE

(75) Inventors: Bruce Barger, West Chester, OH (US); Alan Scott Goldstein, Blue Ash, OH (US); Henry Cheng Na, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/875,311

(22) Filed: Jun. 6, 2001

(65) Prior Publication Data

US 2002/0108640 A1    Aug. 15, 2002

(51) Int. Cl.
*B08B 3/02* (2006.01)

(52) U.S. Cl. .......................... 134/10; 134/34

(58) Field of Classification Search ............... 510/189, 510/214, 215, 217, 238, 239, 240, 108, 475, 510/480; 134/2, 6, 7, 25.2, 10, 25.3, 26, 134/27, 34, 36, 40, 42, 123, 95.3, 111
See application file for complete search history.

(56) References Cited

U.S. PATENT DOCUMENTS

| | | | | |
|---|---|---|---|---|
| 2,078,543 A | * | 4/1937 | Salisbury | 210/409 |
| 2,772,120 A | * | 11/1956 | Olson | 239/462 |
| 2,801,941 A | * | 8/1957 | Johnson | 134/27 |
| 3,103,312 A | * | 9/1963 | Damrow | 239/135 |
| 3,355,018 A | * | 11/1967 | Smith | 210/94 |
| 3,382,177 A | * | 5/1968 | Woodruff | 510/416 |
| 3,459,334 A | * | 8/1969 | Evans | 222/132 |
| 3,464,631 A | * | 9/1969 | Iiefring et al. | 239/135 |
| 3,502,215 A | * | 3/1970 | Cahan | 210/167 |
| 3,507,798 A | * | 4/1970 | Smiens et al. | 510/506 |
| 3,658,590 A | * | 4/1972 | Huebner et al. | 134/32 |
| 3,658,712 A | * | 4/1972 | Linder | 252/186.31 |
| 3,776,850 A | * | 12/1973 | Pearson et al. | 510/434 |
| 3,911,938 A | * | 10/1975 | Wiltrout | 134/104.1 |
| 3,915,738 A | * | 10/1975 | Willard, Sr. | 134/2 |
| 3,928,065 A | * | 12/1975 | Savino | 134/7 |
| 4,135,646 A | * | 1/1979 | Shaw | 222/144 |

(Continued)

FOREIGN PATENT DOCUMENTS

BE          611528    * 6/1979

(Continued)

OTHER PUBLICATIONS

WO 99/60086, filed Nov. 1999, (Cardola).*

(Continued)

*Primary Examiner*—Frankie L. Stinson
(74) *Attorney, Agent, or Firm*—Jeffrey V. Bamber; Mark A. Charles; Kim William Zerby

(57) ABSTRACT

A process is described wherein a surface, for example the exterior surface of a vehicle, is contacted with a cleaning composition capable of rendering the surface treated hydrophilic and then rinsed with purified rinse water. Preferably the process also involves a pre-wetting step, wherein the surface is rinsed with water prior to being contacted with the cleaning composition, and/or an additional rinsing step, wherein the surface is rinsed with unpurified water prior to rinsing with the purified rinse water.

34 Claims, 1 Drawing Sheet

U.S. PATENT DOCUMENTS

| | | | | |
|---|---|---|---|---|
| 4,253,842 | A * | 3/1981 | Ehrlich | 510/277 |
| 4,294,729 | A * | 10/1981 | Bakos et al. | 510/175 |
| 4,307,840 | A * | 12/1981 | Schulze et al. | 239/451 |
| 4,368,146 | A | 1/1983 | Aronson et al. | |
| 4,442,003 | A * | 4/1984 | Holt | 210/445 |
| 4,715,391 | A * | 12/1987 | Scheller | 134/57 R |
| 4,764,047 | A * | 8/1988 | Johnston et al. | 401/289 |
| 4,967,960 | A * | 11/1990 | Futrell | 239/148 |
| 5,057,152 | A * | 10/1991 | Marcus et al. | 106/3 |
| 5,098,023 | A * | 3/1992 | Burke | 239/273 |
| 5,192,025 | A * | 3/1993 | Hu et al. | 239/394 |
| 5,238,595 | A * | 8/1993 | Crutcher et al. | 510/418 |
| 5,595,345 | A | 1/1997 | Chura et al. | |
| 5,595,451 | A * | 1/1997 | Harrison, Jr. | 401/219 |
| 5,647,977 | A * | 7/1997 | Arnaud | 210/167 |
| 5,665,245 | A * | 9/1997 | Kloss et al. | 210/744 |
| 5,721,306 | A * | 2/1998 | Tsipursky et al. | 524/449 |
| 5,759,980 | A * | 6/1998 | Russo et al. | 510/241 |
| 5,782,988 | A * | 7/1998 | Whatley, Sr. | 134/18 |
| 5,850,973 | A | 12/1998 | Liljeqvist et al. | |
| 5,871,590 | A * | 2/1999 | Hei et al. | 134/26 |
| 5,962,388 | A | 10/1999 | Sherry et al. | |
| 6,125,860 | A * | 10/2000 | de Sebastian | 134/57 R |
| 6,158,673 | A * | 12/2000 | Toetschinger et al. | 239/305 |
| 6,194,372 | B1 * | 2/2001 | Picken et al. | 510/403 |
| 6,284,124 | B1 * | 9/2001 | DiMascio et al. | 205/753 |
| 6,342,473 | B1 * | 1/2002 | Kott et al. | 510/357 |
| 6,350,725 | B1 * | 2/2002 | Levitt et al. | 510/189 |
| 6,369,019 | B1 * | 4/2002 | Gordon et al. | 510/421 |
| 6,407,051 | B1 * | 6/2002 | Smith et al. | 510/417 |
| 6,484,735 | B1 | 11/2002 | Gordon et al. | |
| 6,520,190 | B2 * | 2/2003 | Thompson et al. | 134/22.18 |
| 6,527,196 | B1 * | 3/2003 | Ehrick et al. | 239/1 |
| 6,537,957 | B1 * | 3/2003 | Cardola et al. | 510/238 |
| 6,641,740 | B2 * | 11/2003 | Cornelius et al. | 210/698 |
| 6,716,805 | B1 * | 4/2004 | Sherry et al. | 510/295 |
| 2002/0046969 | A1 | 4/2002 | Bartsch et al. | |
| 2002/0102359 | A1 | 8/2002 | Rohrbaugh et al. | |
| 2002/0144712 | A1 | 10/2002 | Barger et al. | |
| 2002/0160224 | A1 | 10/2002 | Barger et al. | |
| 2002/0160924 | A1 | 10/2002 | Bertrem et al. | |
| 2002/0179535 | A1 * | 12/2002 | Lutich | 210/688 |

FOREIGN PATENT DOCUMENTS

| | | | |
|---|---|---|---|
| DE | A-2161591 | | 6/1973 |
| DE | 38 14 726 | * | 11/1989 |
| EP | 0 859 046 A1 | | 8/1988 |
| EP | 0 467 472 A2 | | 1/1992 |
| EP | 0 859 045 A1 | | 8/1998 |
| EP | 0 919 610 A1 | | 6/1999 |
| JP | 7-251169 | * | 10/1995 |
| JP | 07-268671 | | 10/1995 |
| JP | 2000-102748 | * | 4/2000 |
| WO | WO95/00611 A1 | | 1/1995 |
| WO | WO97/03180 A1 | | 1/1997 |
| WO | WO97/33963 A1 | | 9/1997 |
| WO | WO97/43373 A1 | | 11/1997 |
| WO | WO97/48927 | * | 12/1997 |
| WO | WO97/48927 A1 | | 12/1997 |
| WO | WO98/01223 A1 | | 1/1998 |
| WO | WO98/36046 | * | 8/1998 |
| WO | WO99/20724 | * | 4/1999 |
| WO | WO99/23194 | * | 5/1999 |
| WO | WO 00/77138 A1 | | 12/2000 |
| WO | WO 00/77143 A1 | | 12/2000 |
| WO | WO 00/77144 A1 | | 12/2000 |
| WO | WO 01/05920 A1 | | 1/2001 |
| WO | WO 01/96036 A1 | | 12/2001 |

OTHER PUBLICATIONS

WO 99.20724, filed Apr. 1999, (Gordon).*
WIPO WO 98/01223, filed Jan. 1998, Yeiser.*

* cited by examiner

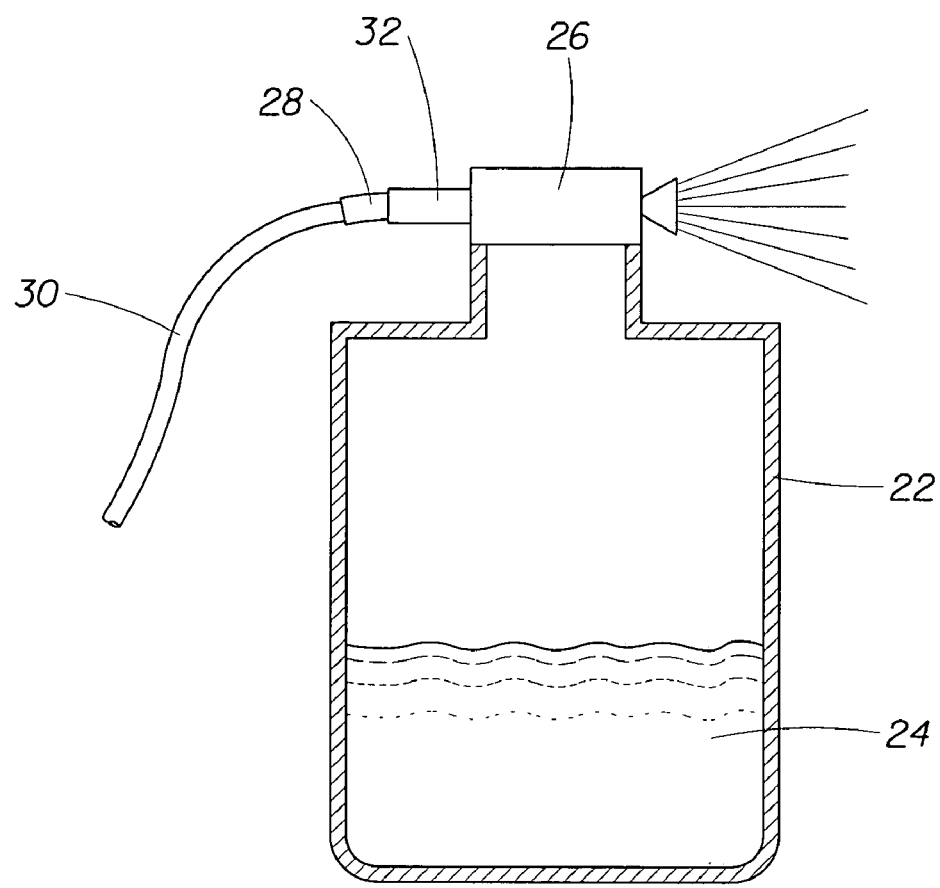

PROCESS FOR CLEANING A SURFACE

This application claims the benefit of the filing date of PCT international patent application US00/16349 filed on Jun. 14, 2000.

TECHNICAL FIELD

The present invention relates to a process for cleaning a surface, preferably surfaces such as ceramic, steel, plastic, glass and/or painted surfaces such as the exterior surface of a vehicle. The surface is contacted with a cleaning composition which renders the surface hydrophilic and is then rinsed with purified rinse water.

BACKGROUND

Products for cleaning hard surfaces are widely available on the market. These products are used for two purposes, the first being to clean soil from the surface and the second being to leave the surface with an aesthetically pleasing finish e.g. spot-free or shiny. However products available on the market often require rinsing with water after use. Typically when the water dries from the surface water-marks, smears or spots are left behind. These water-marks, it is believed may be due to the evaporation of water from the surface leaving behind deposits of minerals which were present as dissolved solids in the water, for example calcium, magnesium and sodium ions and salts thereof or may be deposits of water-carried soils, or even remnants from a cleaning product, for example soap scum. This problem is often exacerbated by some cleaning compositions which modify the surface during the cleaning process in such a way that after rinsing, water forms discrete droplets or beads on the surface instead of draining off. These droplets or beads dry to leave consumer noticeable spots or marks known as water-marks. This problem is particularly apparent when cleaning ceramic, steel, plastic, glass or painted surfaces. A means of solving this problem, known in the art is to dry the water from the surface using a cloth or chamois before the water-marks form. However this drying process is time consuming and requires considerable physical effort.

U.S. Pat. No. 5,759,980 (Blue Coral) describes a composition for cleaning cars which is described to eliminate the problem of water-marks. The composition described comprises a surfactant package comprising a silicone-based surfactant and a polymer which is capable of bonding to a surface to make it hydrophilic. However the Applicants have found that the polymers described in this document are removed from the surface during rinsing of the product from the surface. Hence since the surface hydrophilicity is allegedly provided by the composition as described in the patent and the composition is completely removed from the surface after the first rinse, the alleged hydrophilicity is also removed. The result is that the benefit provided by the composition is lost when the surface is rinsed.

DE-A-21 61 591 also describes a composition for cleaning cars wherein the surface is made hydrophilic by application of animo-group containing copolymers such as polyermic ethyleneimines, polymeric dimethyl aminoethylacrylate or methacrylate or mixed polymerisates. However as with the composition described above the polymers are also rinsed off in the first rinse of the car, thereby removing any benefit the polymers could have provided.

It is thus the object of the present invention to provide a process of cleaning a surface without the subsequent appearance of water-marks, even after the first and/or subsequent rinses. The process involves the steps of contacting a surface with a specially designed cleaning composition and then rinsing the surface with purified water to reduce the appearance of water spots. Furthermore, the above benefit provided by the process of the present invention is durable meaning that the benefit can still be perceived after successive rinses, including after intentional rinsing by the user or by rain water. By intentional rinsing it is meant rinsing the surface using a suitable rinsing device such as a hose, shower, bucket, cloth, sponge.

By the term 'surface' it is meant those surfaces typically found in houses like kitchens and bathrooms, e.g., floors, walls, tiles, windows, sinks, baths, showers, WCs, fixtures and fittings made of different materials like ceramic, porcelain, enamel, vinyl, no-wax vinyl, linoleum, melamine, glass, any plastics, plastified wood, metal, especially steel and chrome metal, varnished or sealed surfaces and especially, the exterior surfaces of a vehicle, e.g. painted, plastic or glass surfaces and finishing coats.

SUMMARY OF THE INVENTION

The present invention relates to a process for cleaning a surface by first contacting the surface with a cleaning composition capable of rendering the surface hydrophilic and then rinsing the surface with purified rinse water.

In a further aspect the present invention relates to a process which additionally comprises the step of pre-wetting the surface prior to contacting the surface with the cleaning composition. In yet another aspect, the present invention relates to a process which additionally comprises the step of rinsing the surface with unpurified rinse water and subsequently finally rinsing with purified rinse water.

BRIEF DESCRIPTION OF THE DRAWINGS

FIG. 1 is a schematic view of one embodiment of a process for cleaning a surface.

DETAILED DESCRIPTION OF THE INVENTION

The present invention encompasses a process of cleaning a surface, wherein the surface to be cleaned is contacted with a cleaning composition and then rinsed with purified rinse water.

By surfaces, it is meant herein any kind of surfaces typically found in houses like kitchens, bathrooms, or the exterior surfaces of a vehicle, e.g., floors, walls, tiles, windows, sinks, showers, shower plastified curtains, wash basins, WCs, dishes, fixtures and fittings and the like made of different materials like ceramic, vinyl, no-wax vinyl, linoleum, melamine, glass, any plastics, plastified wood, metal, especially steel and chrome metal or any painted or varnished or sealed surface and the like. Surfaces also include household appliances including, but not limited to, refrigerators, freezers, washing machines, automatic dryers, ovens, microwave ovens, dishwashers and so on. The present composition is especially efficacious in the cleaning of ceramic, steel, plastic, glass and the exterior painted or otherwise finished surface of a vehicle e.g. a car.

The cleaning composition is applied to the surface optionally, but preferably after a pre-wetting step. The composition can be applied using a cloth or sponge onto which the composition has been applied or by pouring the composition over the surface. Alternatively the composition may be applied by spraying the composition onto the surface using a spraying device.

Once the composition has been applied to the surface, the surface is then rinsed with purified rinse water. Alternatively, and preferably, the majority of the cleaning composition is rinsed from the surface using unpurified water and then subsequently the surface is finally rinsed with purified rinse water. The surface can then be left to dry naturally. A particular benefit of the present composition is that the surface is cleaned and rinsed as described above and the surface then left to dry naturally without the formation of water spots or streaks.

The final rinse of purified rinse water can be delivered by any suitable means but is preferably, for convenience delivered to the surface using the hose-end spray device described below which comprises a container for storing the cleaning composition and a purifying device.

By purified rinse water it is meant water from which any suspended and/or dissolved solids (cations and anions) and other contaminants (organic and inorganic) or impurities have been removed, preferably using a filtering process. Any suitable purifying device may be used for the purpose used herein. In a preferred embodiment the purifying device is a component of the spray dispenser. In a further preferred embodiment the purifying device is a filtering device, even more preferably comprising an ion exchange resin or more preferably a mixture of several ion exchange resins or most preferably layers of different ion exchange resins. The ion exchange resin is selected from the group consisting of strong acid cation (SAC), strong base anion (SBA), weak acid cation (WAC) and weak base anion (WBA) ion exchange resins. Strong acid or strong base ion exchange resins are those which comprise a strong acid or base functionality. A strong acid or strong base functionality are those which have a pKa or pKb, respectively, of higher than 2.5. A weak acid or base functionality is defined by a pKa or pKb, respectively, of less than 2.5. In preferred embodiment the purifying device comprises a random mixture of strong acidic and strong basic ion exchange resins. In an even more preferred embodiment the purifying device comprises a sequential bed design of three different ion exchange resins, namely WAC, SAC and WBA and even more preferably in that order.

By SAC ion exchange resin it is meant a resin that selectively filters all cations including calcium, magnesium and sodium. Examples of SAC ion exchange resins include, but are not limited to Rohm and Haas IRN77, 1500H and Purlite C100H.

By SBA ion exchange resin it is meant a resin that selectively filters all anions including sulfate, chloride, carbonate, bicarbonate and silicate. Examples of SBA ion exchange resins include, but are not limited to Rohm and Haas 4400OH and Purlite A400OH.

By WAC ion exchange resin it is meant a resin that selectively filters the hardness ion and other multi-valent and mono-valent cations associated with alkalinity. Examples of WAC ion exchange resins include, but are not limited to Rohm and Haas IRC86 and Purlite C104.

By WBA ion exchange resin it is meant a resin that selectively filters strong acid anions such as sulfate and chloride. Examples of WBA ion exchange resins include, but are not limited to Rohm and Haas IRA67 and Purlite A830.

In a preferred embodiment, small particle size resin beads are used for higher ion exchange efficiency. By small particle size resin beads it is preferably meant beads of less than 1.0 mm in diameter, more preferably less than 0.6 mm and most preferably less than 0.4 mm in diameter. It is believed that small particle size resin beads provide improved efficiency due to the faster ion exchange kinetics of the smaller particle size resins. The faster kinetics results in greater utilization of the ion exchange capacity. In a further preferred embodiment the filter has a volume capacity of no greater than 100 in$^3$ and is suitable for use in a hand-held device. In a further preferred embodiment the filter has a volume capacity of at least 4 in$^3$, more preferably at least 6 most preferably at least 8 in$^3$.

In a particularly preferred embodiment the purifying device comprises a visual indicator of depletion of purifying capacity. In a preferred embodiment at least one type of resin in the purifying device provides the visual indicator. In a particularly preferred embodiment the visual indicator is provided by a change in colour of a resin. Indicators generally used for acid/base titration can also be used to indicate the depletion of resin exchange capacity. Since many indicators themselves are ionic in nature, ion resins can be prepared in indicator form by treating them with 0.1% solution of the indicator in 95% ethanol. Typical indicators used include phenolphthalein, thymol blue and bromocresol green. The mechanism of the indicator color change on the resin is basically the same as the mechanism in a solution during an acid/base titration. The water trapped in the SAC matrix, for example, is very acidic by nature because of the hydrogen ions. As the hydrogen ions gets exchanged out, the pH slowly rises. Eventually this pH change triggers the color change. Thymol blue, for example, has a transition range between pH 1.2-2.8. Commercially available resins that change color upon exhaustion include Purolite MB400IND (blue regenerated, amber exhausted) and MB400QR (colorless regenerated, red exhausted). Many resin manufacturers will also dye the resins upon request for specific applications.

The Cleaning Composition

The cleaning composition applied to the surface to be cleaned is capable of rendering the surface hydrophilic. By the term hydrophilic it is meant that the surface has a high affinity for water. Because of the affinity between water and the surface, water spreads out on the surface to maximise contact. The higher the hydrophilicity the greater the spread and the smaller the contact angle. Hydrophilicity can be determined by measuring the contact angle between the surface and a droplet of water on the surface. Contact angle is measured according to the American Standard Test Method for measuring contact angle, designation number D5725-95 using the apparatus commercially sold under the trade name Contact Angle Measuring System G10 by Kruss.

In a preferred embodiment of the present invention the surface after treatment with the composition has a contact angle of less than 80°, more preferably the surface has a contact angle of less than 40°, most preferably less than 20°.

Preferably the composition as described herein comprises a polymer which is capable of rendering the surface cleaned hydrophilic. The polymer should a surface substantive polymer meaning that it is capable of modifying the surface by adhering or in some way associating with the surface to be cleaned such that it preferably remains on the surface during and after the cleaning process. Such adhesion or association may be for example by: covalent interaction; electrostatic interaction; hydrogen bonding; or van der waals forces. The polymer modifies the surface by rendering it hydrophilic meaning that the contact angle between water and the surface, after the surface has been treated with the polymer-containing composition is preferably less than 40°, more preferably less than 30°, most preferably 20° or less.

In a further embodiment, the polymer were present is preferably also capable of durably modifying the surface to render it hydrophilic, providing a surface contact angle between water and the surface of less than 80°, more preferably less than 40°, more preferably less than 30°, most preferably 20° or less. By 'durably' it is meant that the hydrophilic surface modification is maintained for at least one rinse, preferably at least three rinses, more preferably at least five rinses, more preferably at least seven rinses, most preferably at least ten rinses or even at least thirty rinses carried out according to the rinse test method described herein.

Rinse Test Method

The rinse test method used according to the present invention consists of spraying the surface with water having 24 French degree hardness using a water delivery device, for example a conventional garden hose or a shower head at a distance from the surface of 1.0 meters for 30 seconds. The flow rate of the water from the water delivery system is approximately 10 liters per minute.

The polymer of the present invention may be a homo or copolymer and preferably comprises at least one hydrophobic or cationic moiety and at least one hydrophilic moiety. The hydrophobic moiety is preferably aromatic, C8-18 linear or branched carbon chain, vinyl imidazole or a propoxy group. Cationic moieties include any group that is positively charged or has a positive dipole. The hydrophilic moiety may be selected from any moiety that forms a dipole which is capable of hydrogen bonding. Suitable examples of such hydrophilic moieties include vinyl pyrrolidone, carboxylic acid, such as acrylic acid, methacrylic acid, maleic acid, and ethoxy groups.

In a preferred aspect of the present invention, the polymer is selected from the group consisting of copolymers of polyvinyl pyrrolidone. A particularly preferred copolymer of polyvinyl pyrrolidone is N-vinylimidazole N-vinylpyrrolidone (PVPVI) polymers available from for example BASF under the trade name Luvitec VP155K18P. Preferred PVPVI polymers have an average molecular weight of from 1,000 to 5,000,000, more preferably from 5,000 to 2,000,000, even more preferably from 5,000 to 500,000 and most preferably from 5,000 to 15,000. Preferred PVPVI polymers comprise at least 55%, preferably at least 60% N-vinylimidazole monomers. Alternatively another suitable polymer may be a quaternized PVPVI for example the compound sold under the tradename Luvitec Quat 73W by BASF.

Other suitable copolymers of vinylpyrrolidone for use in the compositions of the present invention are quaternized vinylpyrrolidone/dialkylaminoalkyl acrylate or methacrylate copolymers. The quaternized vinylpyrrolidone/dialkylaminoalkyl acrylate or methacrylate copolymers suitable for use in the compositions of the present invention are according to the following formula:

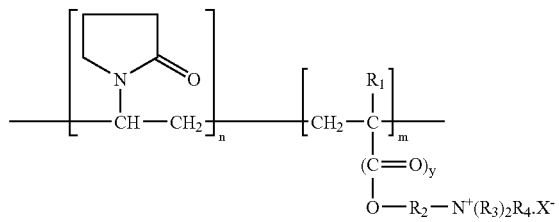

in which n is between 20 and 99 and preferably between 40 and 90 mol % and m is between 1 and 80 and preferably between 5 and 40 mol %; $R_1$ represents H or $CH_3$; y denotes 0 or 1; $R_2$ is —$CH_2$—$CHOH$—$CH_2$— or $C_xH_{2x}$, in which x=2 to 18; $R_3$ represents a lower alkyl group of from 1 to 4 carbon atoms, preferably methyl or ethyl, or

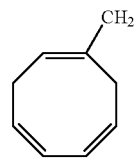

$R_4$ denotes a lower alkyl group of from 1 to 4 carbon atoms, preferably methyl or ethyl; $X^-$ is chosen from the group consisting of Cl, Br, I, ½$SO_4$, $HSO_4$ and $CH_3SO_3$. The polymers can be prepared by the process described in French Pat. Nos. 2,077,143 and 2,393,573.

The preferred quaternized vinylpyrrolidone/dialkylaminoalkyl acrylate or methacrylate copolymers for use herein have a molecular weight of between 1,000 and 1,000,000, preferably between 10,000 and 500,000 and more preferably between 10,000 and 100,000.

Such vinylpyrrolidone/dialkylaminoalkyl acrylate or methacrylate copolymers are commercially available under the name copolymer 845®, Gafquat 734®, or Gafquat 755® from ISP Corporation, New York, N.Y. and Montreal, Canada or from BASF under the tradename Luviquat®.

Most preferred herein are quaternized copolymers of vinyl pyrrolidone and dimethyl aminoethymethacrylate (polyquaternium-11) available from BASF.

Another preferred polymer is polyvinyl pyridine N-oxide (PVNO) polymer available from, for example Reilly. Preferred PVNO polymers have an average molecular weight of 1000 to 2000000, more preferably from 5000 to 500000, most preferably from 15000 to 50000.

The average molecular weight range was determined by light scattering as described in Barth H. G. and Mays J. W. Chemical Analysis Vol 113, "Modern Methods of Polymer Characterization".

The polymer is preferably present in the composition at a level of from 0.001% to 10%, more preferably 0.01% to 5%, most preferably 0.01% to 1% by weight of the composition.

Optional Ingredients

The compositions as described herein may comprise a variety of optional ingredients depending on the technical benefit required and the surface treated.

Suitable optional ingredients for use herein can be selected from the groups consisting of anti-resoiling ingredients, surfactants, clay, chelating agents, enzymes, hydrotopes ions, suds control agents solvents, buffers, thickening agents, radical scavengers, soil suspending polymers, pigments, dyes preservatives and/or perfumes.

Anti-resoiling Ingredients

In one preferred embodiment the composition comprises an anti-resoiling ingredient or a mixture thereof.

Suitable anti-resoiling ingredients include those well known to those skilled in the art, amongst which include polyalkoxylene glycol diester, vinylpyrrolidone homopolymer or copolymer other than those described above, polysaccharide polymer, polyalkoxylene glycol, mono- or di-capped polyalkoxylene glycol, as defined herein after, or a mixture thereof.

Typically, the compositions of the present invention may comprise up to 20%, preferably from 0.001% to 10%, more preferably from 0.005% to 5% and most preferably from 0.005% to 2% by weight of an anti-resoiling ingredient.

Suitable vinylpyrrolidone homopolymers for use herein is an homopolymer of N-vinylpyrrolidone having the following repeating monomer:

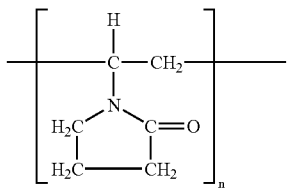

wherein n (degree of polymerisation) is an integer of from 10 to 1,000,000 preferably from 20 to 100,000, and more preferably from 20 to 10,000.

Accordingly, suitable vinylpyrrolidone homopolymers ("PVP") for use herein have an average molecular weight of from 1,000 to 100,000,000, preferably from 2,000 to 10,000,000, more preferably from 5,000 to 1,000,000, and most preferably from 50,000 to 500,000.

Suitable vinylpyrrolidone homopolymers are commercially available from ISP Corporation, New York, N.Y. and Montreal, Canada under the product names PVP K-15® (viscosity molecular weight of 10,000), PVP K-30® (average molecular weight of 40,000), PVP K-60® (average molecular weight of 160,000), and PVP K-90® (average molecular weight of 360,000). Other suitable vinylpyrrolidone homopolymers which are commercially available from BASF Cooperation include Sokalan HP 165® and Sokalan HP 12®; vinylpyrrolidone homopolymers known to persons skilled in the detergent field (see for example EP-A-262,897 and EP-A-256,696).

Suitable copolymers of vinylpyrrolidone for use herein include copolymers of N-vinylpyrrolidone and alkylenically unsaturated monomers or mixtures thereof.

The alkylenically unsaturated monomers of the copolymers herein include unsaturated dicarboxylic acids such as maleic acid, chloromaleic acid, fumaric acid, itaconic acid, citraconic acid, phenylmaleic acid, aconitic acid, acrylic acid, and vinyl acetate. Any of the anhydrides of the unsaturated acids may be employed, for example acrylate, methacrylate. Aromatic monomers like styrene, sulphonated styrene, alpha-methyl styrene, vinyl toluene, t-butyl styrene and similar well known monomers may be used.

The molecular weight of the copolymer of vinylpyrrolidone is not especially critical so long as the copolymer is water-soluble, has some surface activity and is adsorbed to the hard-surface from the liquid composition or solution (i.e. under dilute usage conditions) comprising it in such a manner as to increase the hydrophilicity of the surface. However, the preferred copolymers of N-vinylpyrrolidone and alkylenically unsaturated monomers or mixtures thereof, have a molecular weight of between 1,000 and 1,000,000, preferably between 10,000 and 500,000 and more preferably between 10,000 and 200,000.

Such copolymers of N-vinylpyrrolidone and alkylenically unsaturated monomers like PVP/vinyl acetate copolymers are commercially available under the trade name Luviskol® series from BASF.

Other suitable polymers for used herein are the polysaccharide polymers including substituted cellulose materials like carboxymethylcellulose, ethyl cellulose, hydroxyethyl cellulose, hydroxypropyl cellulose, hydroxymethyl cellulose, succinoglycan and naturally occurring polysaccharide polymers like xanthan gum, guar gum, locust bean gum, tragacanth gum or derivatives thereof, or mixtures thereof.

Particularly polysaccharide polymers to be used herein are xanthan gum and derivatives thereof. Xanthan gum and derivatives thereof may be commercially available for instance from Kelco under the trade name Keltrol RD®, Kelzan S® or Keizan T®.

Suitable additional anti-resoiling ingredients for use herein further include polyalkoxylene glycol, mono- and dicapped polyalkoxylene glycol or a mixture thereof, as defined herein after.

Suitable polyalkoxylene glycols for use herein are according to the following formula H—O—(CH$_2$—CHR$_2$O)$_n$—H.

Suitable monocapped polyalkoxylene glycols for use herein are according to the following formula R$_1$—O—(CH$_2$—CHR$_2$O)$_n$—H.

Suitable dicapped polyalkoxylene glycols for use herein are according to the formula R$_1$—O—(CH$_2$—CHR$_2$O)$_n$—R$_3$.

In these formulas the substituents R$_1$ and R$_3$ each independently are substituted or unsubstituted, saturated or unsaturated, linear or branched hydrocarbon chains having from 1 to 30 carbon atoms, or amino bearing linear or branched, substituted or unsubstituted hydrocarbon chains having from 1 to 30 carbon atoms, R$_2$ is hydrogen or a linear or branched hydrocarbon chain having from 1 to 30 carbon atoms, and n is an integer greater than 0.

Preferably R$_1$ and R$_3$ each independently are substituted or unsubstituted, linear or branched alkyl groups, alkenyl groups or aryl groups having from 1 to 30 carbon atoms, preferably from 1 to 16, more preferably from 1 to 8 and most preferably from 1 to 4, or amino bearing linear or branched, substituted or unsubstituted alkyl groups, alkenyl groups or aryl groups having from 1 to 30 carbon atoms, more preferably from 1 to 16, even more preferably from 1 to 8 and most preferably from 1 to 4. Preferably R$_2$ is hydrogen, or a linear or branched alkyl group, alkenyl group or aryl group having from 1 to 30 carbon atoms, more preferably from 1 to 16, even more preferably from 1 to 8, and most preferably R$_2$ is methyl, or hydrogen. Preferably n is an integer greater than 1, more preferably from 5 to 1000, more preferably from 10 to 100, even more preferably from 20 to 60 and most preferably from 30 to 50.

The preferred polyalkoxylene glycols, mono and dicapped polyalkoxylene glycols to be used herein have a molecular weight of at least 200, more preferably from 400 to 5000 and most preferably from 800 to 3000.

Suitable monocapped polyalkoxylene glycols for use herein include 2-aminopropyl polyethylene glycol (MW 2000), methyl polyethylene glycol (MW 1800) and the like.

Such monocapped polyalkoxylene glycols may be commercially available from Hoescht under the polyglycol series or Hunstman under the tradename XTJ®. Suitable polyalkoxylene glycols to be used herein are polyethylene glycols like polyethylene glycol (MW 2000).

Suitable dicapped polyalkoxylene glycols for use herein include O,O'-bis(2-aminopropyl)polyethylene glycol (MW 2000), O,O'-bis(2-aminopropyl)polyethylene glycol (MW 400), O,O'-dimethyl polyethylene glycol (MW 2000), dimethyl polyethylene glycol (MW 2000), or mixtures thereof. A preferred dicapped polyalkoxylene glycol for use herein is dimethyl polyethylene glycol (MW 2000). For instance dimethyl polyethylene glycol may be commercially available from Hoescht as the polyglycol series, e.g. PEG DME-2000, or from Huntsman under the name Jeffamine® and XTJ®.

Preferred anti-resoiling agents include oligomeric terephthalate esters, typically prepared by processes involving at least one transesterification/oligomerization, often with a metal catalyst such as a titanium(IV) alkoxide. Such esters may be made using additional monomers capable of being incorporated into the ester structure through one, two, three, four or more positions, without, of course, forming a densely crosslinked overall structure.

Suitable anti-resoiling agents include a sulfonated product of a substantially linear ester oligomer comprised of an oligomeric ester backbone of terephthaloyl and oxyalkyleneoxy repeat units and allyl-derived sulfonated terminal moieties covalently attached to the backbone, for example as described in U.S. Pat. No. 4,968,451, Nov. 6, 1990 to J. J. Scheibel and E. P. Gosselink. Such ester oligomers can be prepared by: (a) ethoxylating allyl alcohol; (b) reacting the product of (a) with dimethyl terephthalate ("DMT") and 1,2-propylene glycol ("PG") in a two-stage transesterification/oligomerization procedure; and (c) reacting the product of (b) with sodium metabisulfite in water. Other anti-resoiling agents include the nonionic end-capped 1,2-propylene/polyoxyethylene terephthalate polyesters of U.S. Pat. No. 4,711,730, Dec. 8, 1987 to Gosselink et al., for example those produced by transesterification/oligomerization of poly-(ethyleneglycol) methyl ether, DMT, PG and poly (ethyleneglycol) ("PEG"). Other examples of anti-resoiling agents include: the partly- and fully-anionic-end-capped oligomeric esters of U.S. Pat. No. 4,721,580, Jan. 26, 1988 to Gosselink, such as oligomers from ethylene glycol ("EG"), PG, DMT and Na-3,6-dioxa-8-hydroxyoctanesulfonate; the nonionic-capped block polyester oligomeric compounds of U.S. Pat. No. 4,702,857, Oct. 27, 1987 to Gosselink, for example produced from DMT, methyl (Me)-capped PEG and EG and/or PG, or a combination of DMT, EG and/or PG, Me-capped PEG and Na-dimethyl-5-sulfoisophthalate; and the anionic, especially sulfoaroyl, end-capped terephthalate esters of U.S. Pat. No. 4,877,896, Oct. 31, 1989 to Maldonado, Gosselink et al, an example being an ester composition made from m-sulfobenzoic acid monosodium salt, PG and DMT, optionally but preferably further comprising added PEG, e.g., PEG 3400.

Anti-resoiling agents also include: simple copolymeric blocks of ethylene terephthalate or propylene terephthalate with polyethylene oxide or polypropylene oxide terephthalate, see U.S. Pat. No. 3,959,230 to Hays, May 25, 1976 and U.S. Pat. No. 3,893,929 to Basadur, Jul. 8, 1975; cellulosic derivatives such as the hydroxyether cellulosic polymers available as METHOCEL from Dow; the $C_1$-$C_4$ alkyl celluloses and $C_4$ hydroxyalkyl celluloses, see U.S. Pat. No. 4,000,093, Dec. 28, 1976 to Nicol, et al.; and the methyl cellulose ethers having an average degree of substitution (methyl) per anhydroglucose unit from about 1.6 to about 2.3 and a solution viscosity of from about 80 to about 120 centipoise measured at 20° C. as a 2% aqueous solution. Such materials are available as METOLOSE SM100 and METOLOSE SM200, which are the trade names of methyl cellulose ethers manufactured by Shin-etsu Kagaku Kogyo KK.

Suitable anti-resoiling agents characterised by poly(vinyl ester) hydrophobe segments include graft copolymers of poly(vinyl ester), e.g., $C_1$-$C_6$ vinyl esters, preferably poly (vinyl acetate), grafted onto polyalkylene oxide backbones. See European Patent Application 0 219 048, published Apr. 22, 1987 by Kud, et al. Commercially available examples include SOKALAN anti-resoiling agents such as SOKALAN HP-22, available from BASF, Germany. Anti-resoiling agents are polyesters with repeat units containing 10-15% by weight of ethylene terephthalate together with 80-90% by weight of polyoxyethylene terephthalate derived from a polyoxyethylene glycol of average molecular weight 300-5,000. Commercial examples include ZELCON 5126 from Dupont and MILEASE T from ICI.

Another preferred anti-resoiling agent is an oligomer having empirical formula $(CAP)_2(EG/PG)_5(T)_5(SIP)_1$ which comprises terephthaloyl (T), sulfoisophthaloyl (SIP), oxyethyleneoxy and oxy-1,2-propylene (EG/PG) units and which is preferably terminated with end-caps (CAP), preferably modified isethionates, as in an oligomer comprising one sulfoisophthaloyl unit, 5 terephthaloyl units, oxyethyleneoxy and oxy-1,2-propyleneoxy units in a defined ratio, preferably about 0.5:1 to about 10:1, and two end-cap units derived from sodium 2-(2-hydroxyethoxy)-ethanesulfonate. Said anti-resoiling agent preferably further comprises from 0.5% to 20%, by weight of the oligomer, of a crystallinity-reducing stabiliser, for example an anionic surfactant such as linear sodium dodecylbenzenesulfonate or a member selected from xylene-, cumene-, and toluene-sulfonates or mixtures thereof, these stabilizers or modifiers being introduced into the synthesis vessel, all as taught in U.S. Pat. No. 5,415,807, Gosselink, Pan, Kellett and Hall, issued May 16, 1995. Suitable monomers for the above anti-resoiling agent include Na-2-(2-hydroxyethoxy)-ethanesulfonate, DMT, Na-dimethyl-5-sulfoisophthalate, EG and PG.

Yet another group of preferred anti-resoiling agents are oligomeric esters comprising: (1) a backbone comprising (a) at least one unit selected from the group consisting of dihydroxysulfonates, polyhydroxy sulfonates, a unit which is at least trifunctional whereby ester linkages are formed resulting in a branched oligomer backbone, and combinations thereof; (b) at least one unit which is a terephthaloyl moiety; and (c) at least one unsulfonated unit which is a 1,2-oxyalkyleneoxy moiety; and (2) one or more capping units selected from nonionic capping units, anionic capping units such as alkoxylated, preferably ethoxylated, isethionates, alkoxylated propanesulfonates, alkoxylated propanedisulfonates, alkoxylated phenolsulfonates, sulfoaroyl derivatives and mixtures thereof.

Preferred are esters of the empirical formula:

wherein CAP, EG/PG, PEG, T and SIP are as defined hereinabove, (DEG) represents di(oxyethylene)oxy units, (SEG) represents units derived from the sulfoethyl ether of glycerin and related moiety units, (B) represents branching units which are at least trifunctional whereby ester linkages are formed resulting in a branched oligomer backbone, x is from about 1 to about 12, y' is from about 0.5 to about 25, y" is from 0 to about 12, y'" is from 0 to about 10, y'+y"+y'" totals from about 0.5 to about 25, z is from about 1.5 to about 25, z' is from 0 to about 12; z+z' totals from about 1.5 to about 25, q is from about 0.05 to about 12; m is from about 0.01 to about 10, and x, y', y", y'", z, z', q and m represent the average number of moles of the corresponding units per mole of said ester and said ester has a molecular weight ranging from about 500 to about 5,000.

Preferred SEG and CAP monomers for the above esters include Na-2-(2-,3-dihydroxypropoxy)ethanesulfonate ("SEG"), Na-2-{2-(2-hydroxyethoxy) ethoxy} ethanesulfonate ("SE3") and its homologs and mixtures thereof and the products of ethoxylating and sulfonating allyl alcohol. Preferred anti-resoiling agent esters in this class include the product of transesterifying and oligomerizing sodium 2-{2-(2-hydroxyethoxy)ethoxy}ethanesulfonate and/or sodium 2-[2-{2-(2-hydroxy-ethoxy)ethoxy}ethoxy]ethanesulfonate, DMT, sodium 2-(2,3-dihydroxypropoxy) ethane sulfonate, EG, and PG using an appropriate Ti(IV) catalyst and can be designated as $(CAP)2(T)5(EG/PG)1.4(SEG)2.5(B)0.13$ wherein CAP is $(Na+-O_3S[CH_2CH_2O]3.5)-$ and B is a unit from glycerin and the mole ratio EG/PG is about 1.7:1 as measured by conventional gas chromatography after complete hydrolysis.

Additional classes of anti-resoiling agents include: (I) nonionic terephthalates using diisocyanate coupling agents to link polymeric ester structures, see U.S. Pat. No. 4,201,824, Violland et al. and U.S. Pat. No. 4,240,918 Lagasse et al.; and (II) anti-resoiling agents with carboxylate terminal groups made by adding trimellitic anhydride to known anti-resoiling agents to convert terminal hydroxyl groups to trimellitate esters. With the proper selection of catalyst, the trimellitic anhydride forms linkages to the terminals of the polymer through an ester of the isolated carboxylic acid of trimellitic anhydride rather than by opening of the anhydride linkage. Either nonionic or anionic anti-resoiling agents may be used as starting materials as long as they have hydroxyl terminal groups which may be esterified. See U.S. Pat. No. 4,525,524 Tung et al. Other classes include: (III) anionic terephthalate-based anti-resoiling agents of the urethane-linked variety, see U.S. Pat. No. 4,201,824, Violland et al.; (IV) poly(vinyl caprolactam) and related co-polymers with monomers such as vinyl pyrrolidone and/or dimethylaminoethyl methacrylate, including both nonionic and cationic polymers, see U.S. Pat. No. 4,579,681, Ruppert et al.; (V) graft copolymers, in addition to the SOKALAN types from BASF, made by grafting acrylic monomers onto sulfonated polyesters. These anti-resoiling agents assertedly have soil release and anti-redeposition activity similar to known cellulose ethers: see EP 279,134 A, 1988, to Rhone-Poulenc Chemie. Still other classes include: (VI) grafts of vinyl monomers such as acrylic acid and vinyl acetate onto proteins such as caseins, see EP 457,205 A to BASF (1991); and (VII) polyester-anti-resoiling agents prepared by condensing adipic acid, caprolactam, and polyethylene glycol, see Bevan et al., DE 2,335,044 to Unilever N. V., 1974. Other anti-resoiling agents are described in U.S. Pat. Nos. 4,240,918, 4,787,989 and 4,525,524.

Other suitable anti-resoiling agents include the hydrophobically modified cellulosic polymers. The cellulosic based polymer for use herein is preferably of the following formula:

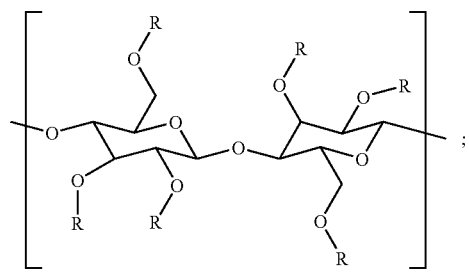

wherein each R is selected from the group consisting of $R_2$, $R_c$, and

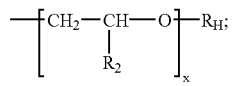

wherein:
each $R_2$ is independently selected from the group consisting of H and $C_1$-$C_4$ alkyl;
each $R_c$ is

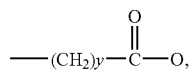

wherein each Z is independently selected from the group consisting of M, $R_2$, $R_c$, and $R_H$;
each $R_H$ is independently selected from the group consisting of $C_5$-$C_{20}$ alkyl, $C_5$-$C_7$ cycloalkyl, $C_7$-$C_{20}$ alkylaryl, $C_7$-$C_{20}$ arylalkyl, substituted alkyl, hydroxyalkyl, $C_1$-$C_{20}$ alkoxy-2-hydroxyalkyl, $C_7$-$C_{20}$ alkylaryloxy-2-hydroxyalkyl, $(R_4)_2$N-alkyl, $(R_4)_2$N-2-hydroxyalkyl, $(R_4)_3$ N-alkyl, $(R_4)_3$ N-2-hydroxyalkyl, $C_6$-$C_{12}$ aryloxy-2-hydroxyalkyl,

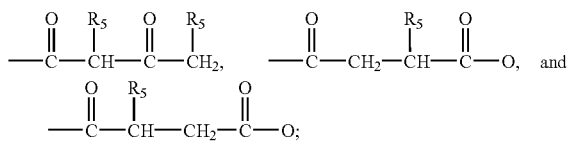

each $R_4$ is independently selected from the group consisting of H, $C_1$-$C_{20}$ alkyl, $C_5$-$C_7$ cycloalkyl, $C_7$-$C_{20}$ alkylaryl, $C_7$-$C_{20}$ arylalkyl, aminoalkyl, alkylaminoalkyl, dialkylaminoalkyl, piperidinoalkyl, morpholinoalkyl, cycloalkylaminoalkyl and hydroxyalkyl;
each $R_5$ is independently selected from the group consisting of H, $C_1$-$C_{20}$ alkyl, $C_5$-$C_7$ cycloalkyl, $C_7$-$C_{20}$ alkylaryl, $C_7$-$C_{20}$ arylalkyl, substituted alkyl, hydroxyalkyl, $(R_4)_2$N-alkyl, and $(R_4)_3$ N-alkyl;

wherein:
M is a suitable cation selected from the group consisting of Na, K, ½Ca, and ½Mg;
each x is from 0 to about 5;
each y is from about 1 to about 5; and provided that:

the Degree of Substitution for group $R_H$ is between about 0.001 and 0.1, more preferably between about 0.005 and 0.05, and most preferably between about 0.01 and 0.05;

the Degree of Substitution for group $R_c$ wherein Z is H or M is between about 0.2 and 2.0, more preferably between about 0.3 and 1.0, and most preferably between about 0.4 and 0.7;

if any $R_H$ bears a positive charge, it is balanced by a suitable anion; and two $R_4$'s on the same nitrogen can together form a ring structure selected from the group consisting of piperidine and morpholine.

The "Degree of Substitution" for group $R_H$, which is sometimes abbreviated herein "$DS_{RH}$", means the number of moles of group $R_H$ components that are substituted per anhydrous glucose unit, wherein an anhydrous glucose unit is a six membered ring as shown in the repeating unit of the general structure above.

The "Degree of Substitution" for group $R_c$, which is sometimes abbreviated herein "$DS_{RC}$", means the number of moles of group $R_c$ components, wherein Z is H or M, that are substituted per anhydrous glucose unit, wherein an anhydrous glucose unit is a six membered ring as shown in the repeating unit of the general structure above. The requirement that Z be H or M is necessary to insure that there are a sufficient number of carboxy methyl groups such that the resulting polymer is soluble. It is understood that in addition to the required number of $R_c$ components wherein Z is H or M, there can be, and more preferably are, additional $R_c$ components wherein Z is a group other than H or M.

These polymers can for example be obtained by use of processes as described in co-pending application PCT/US98119139 and PCT/US98/19142.

Clay

In a preferred embodiment of the present invention the composition comprises a clay to improve the sheeting action of water from the surface treated. Clay is the generic term for a group of hydrated aluminium silicate minerals with a basic composition of $AL_2O_3SiO_2.xH_2O$. Clays typically have a layered structure and may fall into a number of different classes, including kaolinite, montmorillonite/smectite, illite and chlorite groups. Pure clay minerals can be found made naturally, but can alternatively also be made by known synthetic process.

An especially preferred clay component is Laponite which is a nanoparticle synthetic clay, also known as hydrous lithium magnesium silicate (CAS number 53320-86-8). By nanoparticle it is preferably meant clay having particle size of less than 50 mm, more preferably from 20-30 nm. Laponite is a tradename from Laporte Industries and is available from Southern Clay Products Inc. Laponite, a layered silicate, has a disk-like structure with negatively charged faces and a positively charged edge. Laponite is an especially preferred clay for use herein, as it has been found by the Applicant to impart surface hydrophilicity, alone or in combination with other components. Furthermore it is believed that the positively charged PVPVI and PVNO polymers, which are preferred components of the cleaning composition as described herein, interact with the negatively charged Laponite face. It is thus believed that Laponite serves as a linking agent between the polymer molecules, significantly increasing the molecular weight of the polymer and thereby also increasing the surface substantivity of the polymer. It is also believed that the positive charges on the Laponite edge may interact with the charge on the surface being treated and thus further improve the surface substantivity of the polymer by performing an anchoring role. Finally it is also believed that the polymers linked together in this way also produce a more uniform layer of polymer on the surface treated, which in turns improves the shine reflected by the surface.

Laponite in nanoparticle size is also a preferred component of the cleaning composition in this case, since at such small particle size the cleaning composition is transparent, which is not normally the case when using larger particle size clays.

Surfactants

A preferred optional component of the compositions described herein is a surfactant. The presence of a surfactant in the compositions of the present invention have been found to not only improve the cleaning performance, but also act synergistically with the surface substantive polymer. The surfactant can be selected from the group consisting of nonionic surfactants, anionic surfactants, cationic surfactants, zwitterionic surfactants and/or amphoteric surfactants.

Suitable anionic surfactants for use in the compositions herein include water-soluble salts or acids of the formula $ROSO_3M$ wherein R preferably is a $C_7$-$C_{24}$ hydrocarbyl, preferably an alkyl or hydroxyalkyl having a $C_7$-$C_{24}$ alkyl component, more preferably a $C_{12}$-$C_{18}$ alkyl or hydroxyalkyl, and M is H or a cation, e.g., an alkali metal cation (e.g., sodium, potassium, lithium), or ammonium or substituted ammonium (e.g., methyl-, dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine, and mixtures thereof, and the like).

Other suitable anionic surfactants for use herein are water-soluble salts or acids of the formula $RO(A)_mSO_3M$ wherein R is an unsubstituted $C_{10}$-$C_{24}$ alkyl or hydroxyalkyl group having a $C_{10}$-$C_{24}$ alkyl component, preferably a $C_{12}$-$C_{20}$ alkyl or hydroxyalkyl, more preferably $C_{12}$-$C_{18}$ alkyl or hydroxyalkyl, A is an ethoxy or propoxy unit, m is greater than zero, typically between about 0.5 and about 6, more preferably between about 0.5 and about 3, and M is H or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates are contemplated herein. Specific examples of substituted ammonium cations include methyl-, dimethyl-, trimethyl-ammonium and quaternary ammonium cations, such as tetramethyl-ammonium, dimethyl piperdinium and cations derived from alkanolamines such as ethylamine, diethylamine, triethylamine, mixtures thereof, and the like. Exemplary surfactants are $C_{12}$-$C_{18}$ alkyl polyethoxylate (1.0) sulfate, $C_{12}$-$C_{18}$E(1.0)M), $C_{12}$-$C_{18}$ alkyl polyethoxylate (2.25) sulfate, $C_{12}$-$C_{18}$E(2.25)M), $C_{12}$-$C_{18}$ alkyl polyethoxylate (3.0) sulfate $C_{12}$-$C_{18}$E(3.0), and $C_{12}$-$C_{18}$ alkyl polyethoxylate (4.0) sulfate $C_{12}$-$C_{18}$E(4.0)M), wherein M is conveniently selected from sodium and potassium.

Other particularly suitable anionic surfactants for use herein are alkyl sulphonates including water-soluble salts or acids of the formula $RSO_3M$ wherein R is a $C_6$-$C_{22}$ linear or branched, saturated or unsaturated alkyl group, preferably a $C_{10}$-$C_{16}$ alkyl group and more preferably a $C_{12}$-$C_{16}$ alkyl group, and M is H or a cation, e.g., an alkali metal cation (e.g., sodium, potassium, lithium), or ammonium or substituted ammonium (e.g., methyl-, dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine, and mixtures thereof, and the like).

Suitable alkyl aryl sulphonates for use herein include water-soluble salts or acids of the formula $RSO_3M$ wherein R is an aryl, preferably a benzyl, substituted by a $C_6$-$C_{22}$ linear or branched saturated or unsaturated alkyl group, preferably a $C_{10}$-$C_{18}$ alkyl group and more preferably a $C_{12}$-$C_{16}$ alkyl group, and M is H or a cation, e.g., an alkali metal cation (e.g., sodium, potassium, lithium, calcium, magnesium etc) or ammonium or substituted ammonium (e.g., methyl-, dimethyl-, and trimethyl ammonium cations and quaternary ammonium cations, such as tetramethylammonium and dimethyl piperdinium cations and quaternary ammonium cations derived from alkylamines such as ethylamine, diethylamine, triethylamine, and mixtures thereof, and the like).

The alkylsulfonates and alkyl aryl sulphonates for use herein include primary and secondary alkylsulfonates and primary and secondary alkyl aryl sulphonates. By "secondary C6-C22 alkyl or C6-C22 alkyl aryl sulphonates", it is meant herein that in the formula as defined above, the SO3M or aryl-SO3M group is linked to a carbon atom of the alkyl chain being placed between two other carbons of the said alkyl chain (secondary carbon atom).

For example C14-C16 alkyl sulphonate salt is commercially available under the name Hostapur® SAS from Hoechst and C8-alkylsulphonate sodium salt is commercially available under the name Witconate NAS 8® from Witco SA. An example of commercially available alkyl aryl sulphonate is Lauryl aryl sulphonate from Su.Ma. Particularly preferred alkyl aryl sulphonates are alkyl benzene sulphonates commercially available under trade name Nansa® available from Albright & Wilson.

Other anionic surfactants useful for detersive purposes can also be used herein. These can include salts (including, for example, sodium, potassium, ammonium, and substituted ammonium salts such as mono-, di- and triethanolamine salts) of soap, $C_8$-$C_{24}$ olefinsulfonates, sulfonated polycarboxylic acids prepared by sulfonation of the pyrolyzed product of alkaline earth metal citrates, e.g., as described in British patent specification No. 1,082,179, $C_8$-$C_{24}$ alkylpolyglycolethersulfates (containing up to 10 moles of ethylene oxide); alkyl ester sulfonates such as $C_{14-16}$ methyl ester sulfonates; acyl glycerol sulfonates, fatty oleyl glycerol sulfates, alkyl phenol ethylene oxide ether sulfates, paraffin sulfonates, alkyl phosphates, isethionates such as the acyl isethionates, N-acyl taurates, alkyl succinamates and sulfosuccinates, monoesters of sulfosuccinate (especially saturated and unsaturated $C_{12}$-$C_{18}$ monoesters) diesters of sulfosuccinate (especially saturated and unsaturated $C_6$-$C_{14}$ diesters), ethoxylated sulphosuccinates, sulfates of alkylpolysaccharides such as the sulfates of alkylpolyglucoside (the nonionic nonsulfated compounds being described below), branched primary alkyl sulfates, alkyl polyethoxy carboxylates such as those of the formula $RO(CH_2CH_2O)_kCH_2COO$—$M^+$ wherein R is a $C_8$-$C_{22}$ alkyl, k is an integer from 0 to 10, and M is a soluble salt-forming cation. Resin acids and hydrogenated resin acids are also suitable, such as rosin, hydrogenated rosin, and resin acids and hydrogenated resin acids present in or derived from tall oil. Further examples are given in "Surface Active Agents and Detergents" (Vol. I and II by Schwartz, Perry and Berch). A variety of such surfactants are also generally disclosed in U.S. Pat. No. 3,929,678, issued Dec. 30, 1975, to Laughlin, et al. at Column 23, line 58 through Column 29, line 23 (herein incorporated by reference).

Other particularly suitable anionic surfactants for use herein are alkyl carboxylates and alkyl alkoxycarboxylates having from 4 to 24 carbon atoms in the alkyl chain, preferably from 8 to 18 and more preferably from 8 to 16, wherein the alkoxy is propoxy and/or ethoxy and preferably is ethoxy at an alkoxylation degree of from 0.5 to 20, preferably from 5 to 15. Preferred alkylalkoxycarboxylate for use herein is sodium laureth 11 carboxylate (i.e., $RO(C_2H_4O)_{10}$—$CH_2COONa$, with R=C12-C14) commercially available under the name Akyposoft® 100NV from Kao Chemical Gbmh.

Suitable amphoteric surfactants for use herein include amine oxides having the following formula $R_1R_2R_3NO$ wherein each of R1, R2 and R3 is independently a saturated substituted or unsubstituted, linear or branched hydrocarbon chain of from 1 to 30 carbon atoms. Preferred amine oxide surfactants to be used according to the present invention are amine oxides having the following formula $R_1R_2R_3NO$ wherein R1 is a hydrocarbon chain comprising from 1 to 30 carbon atoms, preferably from 6 to 20, more preferably from 8 to 16, most preferably from 8 to 12, and wherein R2 and R3 are independently substituted or unsubstituted, linear or branched hydrocarbon chains comprising from 1 to 4 carbon atoms, preferably from 1 to 3 carbon atoms, and more preferably are methyl groups. R1 may be a saturated, substituted or unsubstituted linear or branched hydrocarbon chain. Suitable amine oxides for use herein are for instance natural blend C8-C10 amine oxides as well as C12-C16 amine oxides commercially available from Hoechst.

Suitable zwitterionic surfactants for use herein contain both a cationic hydrophilic group, i.e., a quaternary ammonium group, and anionic hydrophilic group on the same molecule at a relatively wide range of pH's. The typical anionic hydrophilic groups are carboxylates and sulfonates, although other groups like sulfates, phosphonates, and the like can be used. A generic formula for the zwitterionic surfactants to be used herein is:

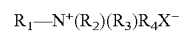

$$R_1—N^+(R_2)(R_3)R_4X^-$$

wherein $R_1$ is a hydrophobic group; $R_2$ is hydrogen, $C_1$-$C_6$ alkyl, hydroxy alkyl or other substituted $C_1$-$C_6$ alkyl group; $R_3$ is $C_1$-$C_6$ alkyl, hydroxy alkyl or other substituted $C_1$-$C_6$ alkyl group which can also be joined to $R_2$ to form ring structures with the N, or a $C_1$-$C_6$ carboxylic acid group or a $C_1$-$C_6$ sulfonate group; $R_4$ is a moiety joining the cationic nitrogen atom to the hydrophilic group and is typically an alkylene, hydroxy alkylene, or polyalkoxy group containing from 1 to 10 carbon atoms; and X is the hydrophilic group which is a carboxylate or sulfonate group.

Preferred hydrophobic groups $R_1$ are aliphatic or aromatic, saturated or unsaturated, substituted or unsubstituted hydrocarbon chains that can contain linking groups such as amido groups, ester groups. More preferred $R_1$ is an alkyl group containing from 1 to 24 carbon atoms, preferably from 8 to 18, and more preferably from 10 to 16. These simple alkyl groups are preferred for cost and stability reasons. However, the hydrophobic group $R_1$ can also be an amido radical of the formula $R_a$—$C(O)$—$NH$—$(C(R_b)_2)_m$, wherein $R_a$ is an aliphatic or aromatic, saturated or unsaturated, substituted or unsubstituted hydrocarbon chain, preferably an alkyl group containing from 8 up to 20 carbon atoms, preferably up to 18, more preferably up to 16, $R_b$ is selected from the group consisting of hydrogen and hydroxy groups, and m is from 1 to 4, preferably from 2 to 3, more preferably 3, with no more than one hydroxy group in any $(C(R_b)_2)$ moiety.

Preferred $R_2$ is hydrogen, or a $C_1$-$C_3$ alkyl and more preferably methyl. Preferred $R_3$ is a $C_1$-$C_4$ carboxylic acid group or C1-C4 sulfonate group, or a $C_1$-$C_3$ alkyl and more preferably methyl. Preferred $R_4$ is $(CH2)_n$ wherein n is an integer from 1 to 10, preferably from 1 to 6, more preferably is from 1 to 3.

Some common examples of betaine/sulphobetaine are described in U.S. Pat. Nos. 2,082,275, 2,702,279 and 2,255,082, incorporated herein by reference.

Examples of particularly suitable alkyldimethyl betaines include coconut-dimethyl betaine, lauryl dimethyl betaine, decyl dimethyl betaine, 2-(N-decyl-N, N-dimethyl-ammonia)acetate, 2-(N-coco N, N-dimethylammonio) acetate, myristyl dimethyl betaine, palmityl dimethyl betaine, cetyl dimethyl betaine, stearyl dimethyl betaine. For example Coconut dimethyl betaine is commercially available from Seppic under the trade name of Amonyl 265®. Lauryl betaine is commercially available from Albright & Wilson under the trade name Empigen BB/L®.

Examples of amidobetaines include cocoamidoethylbetaine, cocoamidopropyl betaine or C10-C14 fatty acylamidopropylene(hydropropylene)sulfobetaine. For example C10-C14 fatty acylamidopropylene(hydropropylene)sulfobetaine is commercially available from Sherex Company under the trade name "Varion CAS® sulfobetaine".

A further example of betaine is Lauryl-imino-dipropionate commercially available from Rhone-Poulenc under the trade name Mirataine H2C-HA®.

Suitable cationic surfactants for use herein include derivatives of quaternary ammonium, phosphonium, imidazolium and sulfonium compounds. Preferred cationic surfactants for use herein are quaternary ammonium compounds wherein one or two of the hydrocarbon groups linked to nitrogen are a saturated, linear or branched alkyl group of 6 to 30 carbon atoms, preferably of 10 to 25 carbon atoms, and more preferably of 12 to 20 carbon atoms, and wherein the other hydrocarbon groups (i.e. three when one hydrocarbon group is a long chain hydrocarbon group as mentioned hereinbefore or two when two hydrocarbon groups are long chain hydrocarbon groups as mentioned hereinbefore) linked to the nitrogen are independently substituted or unsubstituted, linear or branched, alkyl chain of from 1 to 4 carbon atoms, preferably of from 1 to 3 carbon atoms, and more preferably are methyl groups. Preferred quaternary ammonium compounds suitable for use herein are non-chloride/non halogen quaternary ammonium compounds.

Particularly preferred for use in the compositions of the present invention are trimethyl quaternary ammonium compounds like myristyl trimethylsulfate, cetyl trimethylsulfate and/or tallow trimethylsulfate. Such trimethyl quaternary ammonium compounds are commercially available from Hoechst, or from Albright & Wilson under the trade name EMPIGEN CM®.

Amongst the nonionic surfactants, alkoxylated nonionic surfactants are suitable for use herein. Such alkoxylated nonionic are preferably alkoxylated alcohols having a carbon chain containing from 8 to 20 carbon atoms, more preferably from 10 to 18 carbon atoms and most preferably from 10 to 15 carbon atoms. The alkoxylation may be provided by ethoxylate, propoxylate or butoxylate groups, preferably ethoxylate groups. In a preferred aspect the ethoxylated alcohol comprises from 0.5 to 20, more preferably from 2 to 10, most preferably from 4 to 6 ethoxy groups. Preferred alcohol ethoxylates are described in Example 1.

Suitable capped alkoxylated nonionic surfactants for use herein are according to the formula:

$$R_1(O-CH_2-CH_2)_n-(OR_2)_m-O-R_3$$

wherein $R_1$ is a $C_8$-$C_{24}$ linear or branched alkyl or alkenyl group, aryl group, alkaryl group, preferably $R_1$ is a $C_8$-$C_{18}$ alkyl or alkenyl group, more preferably a $C_{10}$-$C_{15}$ alkyl or alkenyl group, even more preferably a $C_{10}$-$C_{15}$ alkyl group;
wherein $R_2$ is a $C_1$-$C_{10}$ linear or branched alkyl group, preferably a $C_2$-$C_{10}$ linear or branched alkyl group;
wherein $R_3$ is a $C_1$-$C_{10}$ alkyl or alkenyl group, preferably a $C_1$-$C_5$ alkyl group, more preferably methyl;
and wherein n and m are integers independently ranging in the range of from 1 to 20, preferably from 1 to 10, more preferably from 1 to 5; or mixtures thereof.

These surfactants are commercially available from BASF under the trade name Plurafac®, from HOECHST under the trade name Genapol® or from ICI under the trade name Symperonic®. Preferred capped nonionic alkoxylated surfactants of the above formula are those commercially available under the tradename Genapol® L 2.5 NR from Hoechst, and Plurafac® from BASF.

In another preferred alternative embodiment suitable surfactants include the alkyl polysaccharide surfactants. The alkyl polysaccharide surfactants, have a hydrophobic group containing from 8 to 20 caron atoms, preferably from 10 to 18 carbon atoms, and a polysaccharide hydrophilic group containing from 1.5 to 10, preferably from 1.5 to 4 saccharide units. Suitable saccharide units include galactoside, glucoside, fructoside, glycosyl, fructosyl and/or galactosyl. Mixtures of saccharide units may be used in the alkyl polysaccharide. Typical hydrophobic groups include alkyl groups, either saturated or nonsaturated, branched or unbranched containing from 6 to 20, preferably from 8 to 18 carbon atoms. Preferably the alkyl group is a linear, saturated alkyl group. The alkyl group can contain up to 3 hydroxy groups and/or the polyalkoxide chain can contain up to 30, preferably less than 10 alkoxide groups. Suitable alkyl polysaccharides are octyl, decyl, dodecyl, tetradcyl, pentadecyl, hexadecyl and actadecyl, di-, tri-, tetra-, penta- and hexa-glucosides, lactosides, fructosides, fructosyls, lactosyls, glucosyls, galactosyls and mixtures thereof.

Particularly preferred surfactants are those selected from the group consisting of alkyl sulphate, alkyl sulphonate, alkyl ethoxy sulphate, alkyl benzene sulphonate, alkyl carboxylate, alkyl ethoxy carboxylate and mixtures thereof. More preferably the surfactant system comprises an alkyl sulphonate and an alkyl ethoxy sulphate.

Other suitable surfactants include silicone surfactants such as organsilane or organosiloxane. Preferably the silicone surfactants have molecular weight of from 600 to 10,000, more preferably from 900 to 6000, most preferably about 3000. Such compounds are well known in the art, examples of which can be found in for example U.S. Pat. No. 3,299,112, U.S. Pat. No. 4,311,695, U.S. Pat. No. 4,782,095 the disclosures of which are incorporated herein by reference. Suitable siloxane oligomers are described in U.S. Pat. No. 4,005,028. Suitable silicone surfactants include polysiloxane polyethylene glycol copolymers, polyalkylene oxide-modified polydimethylsiloxane copolymers.

Other suitable surfactants include the fluorosurfactants which comprise a hydrophilic and a hydrophobic section.

The hydrophilic section comprises an alkyl group having from 2 to 12 carbons and an ester, sulfonate or carboxylate moiety. The hydrophobic section is fluorinated. Preferred fluorosurfactants include alkyl fluorocarboxylates for example ammonium perfluroalkyl carboxylate and potassium fluroalkyl carboxylate. A particularly suitable fluorosurfactants is an aqueous mixture of potassium fluoroalkyl carboxylate and has from 40-44% fluoroalkyl carboxylate having 8 carbon atoms in the alkyl chain, from 1-5% fluoroalkyl carboxylates having 6 carbon atoms in the alkyl chain, from 1-5% fluoroalkyl carboxylates having 4 carbon atoms in the alkyl chain, from 1-3% fluoroalkyl carboxylates having 7 carbon atoms in the alkyl chain and from 0.1-1% fluoroalkyl carboxylates having 5 carbon atoms in the alkyl chain.

In a preferred aspect of the present invention the surfactant is a system comprising at least one anionic surfactant. Particularly preferred anionic surfactants are the linear alkyl ethoxy sulfates, the linear alkyl or alkylbenzene sulphonates and sulphosuccinate surfactants. More particularly the preferred anionic surfactants of the surfactant system, where present, are C12 linear alkylbenzene suphonate (LAS) and dioctyl sulphosuccinate. The preferred nonionic surfactant of the surfactant system, where present, is an alcohol ethoxylates having from 10-14 carbon atoms in the chain and an average of from 5 to 12, preferably from 7 to 10 ethoxy groups.

The ratio of the sulphonate surfactant, preferably LAS to sulphosuccinate surfactant, preferably dioctyl sulphosuccinate is preferably from 6:1 to 1:6, more preferably from 5:1 to 1:2, most preferably 4:1 to 1:1. Where the surfactant system comprises a nonionic surfactant, the ratio of sulphonate to sulphosuccinate to nonionic surfactant is preferably 4:1:1.

Typically, the compositions according to the present invention preferably comprise the surfactant system at a level of from 0.001% to 40%, preferably from 0.001% to 20% and more preferably less than 10% and most preferably from 0.001% to 10% by weight of the composition.

Chelating Agents

The compositions may comprise a chelating agent as a preferred optional ingredient. The Applicants have found that by including a chelating agent in the compositions of the present invention, improved cleaning can be achieved without negatively impacting the performance of the surface substantive polymers. Suitable chelating agents may be any of those known to those skilled in the art such as the ones selected from the group comprising phosphonate chelating agents, amino carboxylate chelating agents, other carboxylate chelating agents, polyfunctionally-substituted aromatic chelating agents, ethylenediamine N,N'-disuccinic acids, or mixtures thereof.

The presence of chelating agents contribute to further enhance the chemical stability of the compositions.

Suitable phosphonate chelating agents for use herein may include alkali metal ethane 1-hydroxy diphosphonates (HEDP), alkylene poly (alkylene phosphonate), as well as amino phosphonate compounds, including amino aminotri (methylene phosphonic acid) (ATMP), nitrilo trimethylene phosphonates (NTP), ethylene diamine tetra methylene phosphonates, and diethylene triamine penta methylene phosphonates (DTPMP). The phosphonate compounds may be present either in their acid form or as salts of different cations on some or all of their acid functionalities.

Polyfunctionally-substituted aromatic chelating agents may also be useful in the compositions herein. See U.S. Pat. No. 3,812,044, issued May 21, 1974, to Connor et al. Preferred compounds of this type in acid form are dihydroxydisulfobenzenes such as 1,2-dihydroxy -3,5-disulfobenzene.

A preferred biodegradable chelating agent for use herein is ethylene diamine N,N'-disuccinic acid, or alkali metal, or alkaline earth, ammonium or substitutes ammonium salts thereof or mixtures thereof. Ethylenediamine N,N'-disuccinic acids, especially the (S,S) isomer have been extensively described in U.S. Pat. No. 4,704,233, Nov. 3, 1987, to Hartman and Perkins. Ethylenediamine N,N'-disuccinic acids is, for instance, commercially available under the tradename ssEDDS® from Palmer Research Laboratories.

Suitable amino carboxylates to be used herein include ethylene diamine tetra acetates, diethylene triamine pentaacetates (DTPA),N-hydroxyethylethylenediamine triacetates, nitrilotri-acetates, ethylenediamine tetrapropionates, triethylenetetraaminehexa-acetates, ethanol-diglycines, propylene diamine tetracetic acid (PDTA) and methyl glycine di-acetic acid (MGDA), both in their acid form, or in their alkali metal, ammonium, and substituted ammonium salt forms. Particularly suitable amino carboxylates to be used herein are diethylene triamine penta acetic acid, propylene diamine tetracetic acid (PDTA) which is, for instance, commercially available from BASF under the trade name Trilon FS® and methyl glycine di-acetic acid (MGDA).

Further carboxylate chelating agents to be used herein include salicylic acid, aspartic acid, glutamic acid, glycine, malonic acid or mixtures thereof.

Another chelating agent for use herein is of the formula:

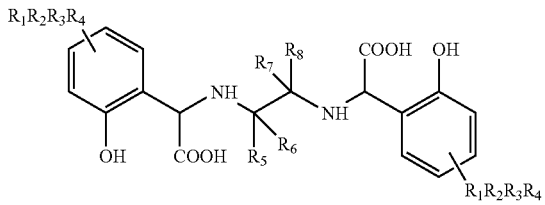

wherein $R_1$, $R_2$, $R_3$, and $R_4$ are independently selected from the group consisting of —H, alkyl, alkoxy, aryl, aryloxy, —Cl, —Br, —NO$_2$, —C(O)R', and —SO$_2$R"; wherein R' is selected from the group consisting of —H, —OH, alkyl, alkoxy, aryl, and aryloxy; R" is selected from the group consisting of alkyl, alkoxy, aryl, and aryloxy; and $R_5$, $R_6$, $R_7$, and $R_8$ are independently selected from the group consisting of —H and alkyl.

Particularly preferred chelating agents to be used herein are amino aminotri(methylene phosphonic acid), di-ethylene-triamino-pentaacetic acid, diethylene triamine penta methylene phosphonate, 1-hydroxy ethane diphosphonate, ethylenediamine N,N'-disuccinic acid, and mixtures thereof.

Other chelating agents include polycarboxylates, especially citrate and complexes of the formula:

CH(A)(COOX)—CH(COOX)—O—CH(COOX)—
CH(COOX)(B)

wherein A is H or OH; B is H or —O—CH(COOX)—CH$_2$ (COOX); and X is H or a salt-forming cation. For example, if in the above general formula A and B are both H, then the compound is oxydisuccinic acid and its water-soluble salts.

If A is OH and B is H, then the compound is tartrate monosuccinic acid (TMS) and its water-soluble salts. If A is H and B is —O—CH(COOX)—CH$_2$(COOX), then the compound is tartrate disuccinic acid (TDS) and its water-soluble salts. Mixtures of these builders are especially preferred for use herein. Particularly TMS to TDS, these builders are disclosed in U.S. Pat. No. 4,663,071, issued to Bush et al., on May 5, 1987.

Still other ether polycarboxylates suitable for use herein include copolymers of maleic anhydride with ethylene or vinyl methyl ether, 1,3,5-trihydroxy benzene-2,4,6-trisulfonic acid.

Other useful polycarboxylate chelating agents include the ether hydroxypolycarboxylates represented by the structure:

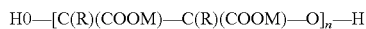

H0—[C(R)(COOM)—C(R)(COOM)—O]$_n$—H wherein M is hydrogen or a cation wherein the resultant salt is water-soluble, preferably an alkali metal, ammonium or substituted ammonium cation, n is from about 2 to about 15 (preferably n is from about 2 to about 10, more preferably n averages from about 2 to about 4) and each R is the same or different and selected from hydrogen, $C_{1-4}$ alkyl or $C_{1-4}$ substituted alkyl (preferably R is hydrogen).

Suitable ether polycarboxylates also include cyclic compounds, particularly alicyclic compounds, such as those described in U.S. Pat. Nos. 3,923,679; 3,835,163; 4,158,635; 4,120,874 and 4,102,903, all of which are incorporated herein by reference.

Preferred amongst those cyclic compounds are dipicolinic acid and chelidanic acid.

Also suitable polycarboxylates for use herein are mellitic acid, succinic acid, polymaleic acid, benzene 1,3,5-tricarboxylic acid, benezene pentacarboxylic acid, and carboxymethyloxysuccinic acid, and soluble salts thereof.

Still suitable carboxylate chelating agents herein include the carboxylated carbohydrates disclosed in U.S. Pat. No. 3,723,322, Diehl, issued Mar. 28, 1973, incorporated herein by reference.

Other suitable carboxylates for use herein, but which are less preferred because they do not meet the above criteria are alkali metal, ammonium and substituted ammonium salts of polyacetic acids. Examples of polyacetic acid chelating agent salts are sodium, potassium, lithium, ammonium and substituted ammonium salts of ethylenediamine, tetraacetic acid and nitrilotriacetic acid.

Other suitable, but less preferred polycarboxylates are those also known as alkyliminoacetic chelating agents such as methyl imino diacetic acid, alanine diacetic acid, methyl glycine diacetic acid, hydroxy propylene imino diacetic acid and other alkyl imino acetic acid chelating agents.

Also suitable in the compositions of the present invention are the 3,3-dicarboxy-4-oxa-1,6-hexanediotes and the related compounds disclosed in U.S. Pat. No. 4,566,984, Bush, issued Jan. 28, 1986, incorporated herein by reference. Useful succinic acid chelating agents include the C5-C20 alkyl succinic acids and salts thereof. A particularly preferred compound of this type is dodecenylsuccinic acid. Alkyl succinic acids typically are of the general formula R—CH(COOH)CH$_2$(COOH) i.e., derivatives of succinic acid, wherein R is hydrocarbon, e.g., $C_{10}$-$C_{20}$ alkyl or alkenyl, preferably $C_{12}$-$C_{16}$ or wherein R may be substituted with hydroxyl, sulfo, sulfoxy or sulfone substituents, all as described in the above-mentioned patents.

The succinate chelating agents are preferably used in the form of their water-soluble salts, including the sodium, potassium, ammonium and alkanolammonium salts.

Specific examples of succinate chelating agents include laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Patent Application 86200690.5/0 200 263, published Nov. 5, 1986.

Examples of useful chelating agents also include sodium and potassium carboxymethyloxymalonate, carboxymethyloxysuccinate, cis-cyclo-hexanehexacarboxylate, cis-cyclopentane-tetracarboxylate, water-soluble polyacrylates and the copolymers of maleic anhydride with vinyl methyl ether or ethylene.

Other suitable polycarboxylates are the polyacetal carboxylates disclosed in U.S. Pat. No. 4,144,226, Crutchfield et al., issued Mar. 13, 1979, incorporated herein by reference. These polyacetal carboxylates can be prepared by bringing together, under polymerization conditions, an ester of glyoxylic acid and a polyerization initiator. The resulting polyacetal carboxylate ester is then attached to chemically stable end groups to stabilize the polyacetal carboxylate against rapid depolymerization in alkaline solution, converted to the corresponding salt, and added to a surfactant.

Polycarboxylate chelating agents are also disclosed in U.S. Pat. No. 3,308,067, Diehl, issued Mar. 7, 1967, incorporated herein by reference. Such materials include the water-soluble salts of homo- and copolymers of aliphatic carboxylic acids such as maleic acid, itaconic acid, mesaconic acid, fumaric acid, aconitic acid, citraconic acid and methylenemalonic acid.

Suitable polyphosphonates for use herein are the alkali metal, ammonium and alkanolammonium salts of polyphosphates (exemplified by the tripolyphosphates, pyrophosphates, and glassy polymeric meta-phosphates), phosphonates.

Most preferably the chelating agents to be used herein is selected from either diethylene triamine penta methylene phosphonate (DTPMP) or ethane 1-hydroxy diphosphonate (HEDP). Such phosphonate chelating agents are commercially available from Monsanto under the trade name DEQUEST®.

Typically, the compositions according to the present invention comprise up to 20%, preferably from 0.01% to 15% by weight and more preferably from 0.01% to 10% by weight of the total composition of a chelating agent.

Enzyme

An enzyme or mixture thereof may be included in the composition as an optional ingredient.

Preferred enzymatic materials include the commercially available lipases, cutinases, amylases, neutral and alkaline proteases, cellulases, endolases, esterases, pectinases, lactases and peroxidases conventionally incorporated into detergent components or compositions. Suitable enzymes are discussed in U.S. Pat. Nos. 3,519,570 and 3,533,139.

Preferred commercially available protease enzymes include those sold under the tradenames Alcalase, Savinase, Primase, Durazym, and Esperase by Novo Industries A/S (Denmark), those sold under the tradename Maxatase, Maxacal and Maxapem by Gist-Brocades, those sold by Genencor International, and those sold under the tradename Opticlean and Optimase by Solvay Enzymes. Protease enzyme may be incorporated into the compositions in accordance with the invention at a level of from 0.0001% to 4% active enzyme by weight of the composition.

Preferred amylases include, for example, α-amylases obtained from a special strain of B licheniformis, described in more detail in GB-1,269,839 (Novo). Preferred commercially available amylases include for example, those sold under the tradename Rapidase by Gist-Brocades, and those sold under the tradename Termamyl, Duramyl and BAN by Novo Industries A/S. Highly preferred amylase enzymes maybe those described in PCT/US 9703635, and in WO95/26397 and WO96/23873.

Amylase enzyme may be incorporated into the composition in accordance with the invention at a level of from 0.0001% to 2% active enzyme by weight of the composition.

Lipolytic enzyme may be present at levels of active lipolytic enzyme of from 0.0001% to 2% by weight, preferably 0.001% to 1% by weight, most preferably from 0.001% to 0.5% by weight of the compositions.

The lipase may be fungal or bacterial in origin being obtained, for example, from a lipase producing strain of Humicola sp., Thermomyces sp. or Pseudomonas sp. including Pseudomonas pseudoalcaligenes or Pseudomas fluorescens. Lipase from chemically or genetically modified mutants of these strains are also useful herein. A preferred lipase is derived from Pseudomonas pseudoalcaligenes, which is described in Granted European Patent, EP-B-0218272.

Another preferred lipase herein is obtained by cloning the gene from Humicola lanuginosa and expressing the gene in Aspergillus oryza, as host, as described in European Patent Application, EP-A-0258 068, which is commercially available from Novo Industri A/S, Bagsvaerd, Denmark, under the trade name Lipolase. This lipase is also described in U.S. Pat. No. 4,810,414, Huge-Jensen et al, issued Mar. 7, 1989.

Hydrotropes

As an optional ingredient, the compositions may comprise a hydrotrope. Suitable hydrotropes herein include sulphonated hydrotropes. Any sulphonated hydrotropes known to those skilled in the art are suitable for use herein. In a preferred embodiment alkyl aryl sulphonates or alkyl aryl sulphonic acids are used. Preferred alkyl aryl sulphonates include sodium, potassium, calcium and ammonium xylene sulphonates, sodium, potassium, calcium and ammonium toluene sulphonates, sodium, potassium, calcium and ammonium cumene sulphonates, sodium, potassium, calcium and ammonium substituted or unsubstituted naphthalene sulphonates and mixtures thereof. Preferred alkyl aryl sulphonic acids include xylenesulphonic acid, toluenesulphonic acid, cumenesulphonic acid, substituted or unsubstituted naphthalenesulphonic acid and mixtures thereof. More preferably, xylenesulphonic acid or p-toluene sulphonate or mixtures thereof are used.

Typically, the compositions herein may comprise from 0.01% to 20%, preferably from 0.05% to 10% and more preferably from 0.1% to 5% by weight of the total composition of a sulphonated hydrotrope.

The sulphonated hydrotrope, when present, contributes to the physical and chemical stability of the compositions as described herein.

Ions

The compositions according to the present invention may further comprise an ion, preferably added to the composition in the form of a salt. Preferred ions to be used herein are sodium, aluminium, ammonium, zinc, cadmium, nickel, copper, cobalt, zirconium, chromium and/or magnesium and more preferred are calcium, zinc, aluminium and/or magnesium. Said ions may be added in the form of salts of for example chloride, acetate, sulphate, formate, carbonate and/or nitrate or as a complex metal salt. For example, calcium may be added in the form of calcium chloride, magnesium as magnesium acetate or magnesium sulphate, zinc as zinc chloride and ammonium as ammonium carbonate. Typically such ions may be present at a level up to 20%, preferably from 0.001% to 10% by weight of the total composition.

Suds Controlling Agents

The compositions according to the present invention may further comprise a suds controlling agent such as 2-alkyl alkanol, or mixtures thereof, as a preferred optional ingredient. Particularly suitable to be used in the present invention are the 2-alkyl alkanols having an alkyl chain comprising from 6 to 16 carbon atoms, preferably from 8 to 12 and a terminal hydroxy group, said alkyl chain being substituted in the $\alpha$ position by an alkyl chain comprising from 1 to 10 carbon atoms, preferably from 2 to 8 and more preferably 3 to 6. Such suitable compounds are commercially available, for instance, in the Isofol® series such as Isofol® 12 (2-butyl octanol) or Isofol® 16 (2-hexyl decanol).

Other suds controlling agents may include alkali metal (e.g., sodium or potassium) fatty acids, or soaps thereof, containing from about 8 to about 24, preferably from about 10 to about 20 carbon atoms.

The fatty acids including those used in making the soaps can be obtained from natural sources such as, for instance, plant or animal-derived glycerides (e.g., palm oil, coconut oil, babassu oil, soybean oil, castor oil, tallow, whale oil, fish oil, tallow, grease, lard and mixtures thereof). The fatty acids can also be synthetically prepared (e.g., by oxidation of petroleum stocks or by the Fischer-Tropsch process).Alkali metal soaps can be made by direct saponification of fats and oils or by the neutralization of the free fatty acids which are prepared in a separate manufacturing process. Particularly useful are the sodium and potassium salts of the mixtures of fatty acids derived from coconut oil and tallow, i.e., sodium and potassium tallow and coconut soaps. The term "tallow" is used herein in connection with fatty acid mixtures which typically have an approximate carbon chain length distribution of 2.5% C14, 29% C16, 23% C18, 2% palmitoleic, 41.5% oleic and 3% linoleic (the first three fatty acids listed are saturated). Other mixtures with similar distribution, such as the fatty acids derived from various animal tallows and lard, are also included within the term tallow. The tallow can also be hardened (i.e., hydrogenated) to convert part or all of the unsaturated fatty acid moieties to saturated fatty acid moieties. When the term "coconut" is used herein it refers to fatty acid mixtures which typically have an approximate carbon chain length distribution of about 8% C8, 7% C10, 48% C12, 17% C14, 9% C16, 2% C18, 7% oleic, and 2% linoleic (the first six fatty acids listed being saturated). Other sources having similar carbon chain length distribution such as palm kernel oil and babassu oil are included with the term coconut oil.

A preferred silicone suds controlling agent is disclosed in Bartollota et al. U.S. Pat. No. 3,933,672. Other particularly useful suds controlling agents are the self-emulsifying silicone suds controlling agents, described in German Patent Application DTOS 2 646 126 published Apr. 28, 1977. An example of such a compound is DC-544, commercially available from Dow Corning, which is a siloxane-glycol copolymer.

Especially preferred silicone suds controlling agents are described in Copending European Patent application N°92201649.8. Said compositions can comprise a silicone/silica mixture in combination with fumed nonporous silica such as Aerosil$^R$.

Especially preferred suds controlling agent are the suds controlling agent system comprising a mixture of silicone oils and the 2-alkyl-alcanols.

Typically, the compositions herein may comprise up to 4% by weight of the total composition of a suds controlling agent, or mixtures thereof, preferably from 0.1% to 1.5% and most preferably from 0.1% to 0.8%.

Solvents

The compositions described herein may further optionally comprise a solvent or a mixtures thereof. Solvent have been found to improve the water drainage from a surface. Solvents for use herein include all those known to the those skilled in the art. Suitable solvents for use herein include ethers and diethers having from 4 to 14 carbon atoms, preferably from 6 to 12 carbon atoms, and more preferably from 8 to 10 carbon atoms, glycols or alkoxylated glycols, alkoxylated aromatic alcohols, aromatic alcohols, aliphatic branched alcohols, alkoxylated aliphatic branched alcohols, alkoxylated linear C1-C5 alcohols, linear C1-C5 alcohols, C8-C14 alkyl and cycloalkyl hydrocarbons and halohydrocarbons, C6-C16 glycol ethers and mixtures thereof.

Suitable glycols to be used herein are according to the formula HO-CR1R2-OH wherein R1 and R2 are independently H or a C2-C10 saturated or unsaturated aliphatic hydrocarbon chain and/or cyclic. Suitable glycols to be used herein are dodecaneglycol and/or propanediol.

Suitable alkoxylated glycols to be used herein are according to the formula R—(A)n—R1—OH wherein R is H, OH, a linear saturated or unsaturated alkyl of from 1 to 20 carbon atoms, preferably from 2 to 15 and more preferably from 2 to 10, wherein R1 is H or a linear saturated or unsaturated alkyl of from 1 to 20 carbon atoms, preferably from 2 to 15 and more preferably from 2 to 10, and A is an alkoxy group preferably ethoxy, methoxy, and/or propoxy and n is from 1 to 5, preferably 1 to 2. Suitable alkoxylated glycols to be used herein are methoxy octadecanol and/or ethoxyethoxyethanol.

Suitable alkoxylated aromatic alcohols to be used herein are according to the formula R (A)$_n$—OH wherein R is an alkyl substituted or non-alkyl substituted aryl group of from 1 to 20 carbon atoms, preferably from 2 to 15 and more preferably from 2 to 10, wherein A is an alkoxy group preferably butoxy, propoxy and/or ethoxy, and n is an integer of from 1 to 5, preferably 1 to 2. Suitable alkoxylated aromatic alcohols are benzoxyethanol and/or benzoxypropanol.

Suitable aromatic alcohols to be used herein are according to the formula R—OH wherein R is an alkyl substituted or non-alkyl substituted aryl group of from 1 to 20 carbon atoms, preferably from 1 to 15 and more preferably from 1 to 10. For example a suitable aromatic alcohol to be used herein is benzyl alcohol.

Suitable aliphatic branched alcohols to be used herein are according to the formula R—OH wherein R is a branched saturated or unsaturated alkyl group of from 1 to 20 carbon atoms, preferably from 2 to 15 and more preferably from 5 to 12. Particularly suitable aliphatic branched alcohols to be used herein include 2-ethylbutanol and/or 2-methylbutanol.

Suitable alkoxylated aliphatic branched alcohols to be used herein are according to the formula R (A)$_n$—OH wherein R is a branched saturated or unsaturated alkyl group of from 1 to 20 carbon atoms, preferably from 2 to 15 and more preferably from 5 to 12, wherein A is an alkoxy group preferably butoxy, propoxy and/or ethoxy, and n is an integer of from 1 to 5, preferably 1 to 2. Suitable alkoxylated aliphatic branched alcohols include 1-methylpropoxyethanol and/or 2-methylbutoxyethanol.

Suitable alkoxylated linear C1-C5 alcohols to be used herein are according to the formula R (A)$_n$—OH wherein R is a linear saturated or unsaturated alkyl group of from 1 to 5 carbon atoms, preferably from 2 to 4, wherein A is an alkoxy group preferably butoxy, propoxy and/or ethoxy, and n is an integer of from 1 to 5, preferably 1 to 2. Suitable alkoxylated aliphatic linear C1-C5 alcohols are butoxy propoxy propanol (n-BPP), butoxyethanol, butoxypropanol, ethoxyethanol or mixtures thereof. Butoxy propoxy propanol is commercially available under the trade name n-BPP® from Dow chemical.

Suitable linear C1-C5 alcohols to be used herein are according to the formula R—OH wherein R is a linear saturated or unsaturated alkyl group of from 1 to 5 carbon atoms, preferably from 2 to 4. Suitable linear C1-C5 alcohols are methanol, ethanol, propanol or mixtures thereof.

Other suitable solvents include butyl diglycol ether (BDGE), butyltriglycol ether, ter amilic alcohol and the like. Particularly preferred solvents to be used herein are butoxy propoxy propanol, butyl diglycol ether, benzyl alcohol, butoxypropanol, ethanol, methanol, isopropanol and mixtures thereof.

Other suitable solvents include mineral sprits, more preferably the mineral spirit commonly known as white spirit.

In one embodiment, particularly preferred solvents are selected from the C1-5 linear or branched alkyl solvents, for example C1-5 linear or branched alcohols.

Particularly preferred solvents for use in this embodiment are ethanol and/or isopropanol.

Typically, the compositions of the present invention, where essentially aqueous comprise up to 30% by weight of the total composition of a solvent or mixtures thereof, preferably up to 10% by weight and more preferably up to 8%.

However where the composition is essentially non-aqueous as described hereafter, the composition may preferably comprise from 60% to 99.5, more preferably from 70% to 99%, more preferably from 90 to 99% and most preferably from 95% to 99% by weight of the total composition of a solvent or mixtures thereof.

pH Buffers

In the embodiment of the present invention the compositions are preferably formulated at neutral pH range, typically from 4.0 to 9.0, more preferably from 4.5 to 8.5. The compositions according to the present invention may further comprise a pH buffer or a mixture thereof, i.e. a system composed of a compound or a combination of compounds, whose pH changes only slightly when a strong acid or base is added.

Suitable pH buffers for use herein in neutral to basic condition include borate pH buffer, phosphonate, silicate and mixtures thereof. Suitable borate pH buffers for use herein include alkali metal salts of borates and alkyl borates and mixtures thereof. Suitable borate pH buffers to be used herein are alkali metal salts of borate, metaborate, tetraborate, octoborate, pentaborate, dodecaboron, borontrifluoride and/or alkyl borate containing from 1 to 12 carbon atoms, and preferably from 1 to 4. Suitable alkyl borate includes methyl borate, ethyl borate and propyl borate. Particularly preferred herein are the alkali metal salts of metaborate (e.g. sodium metaborate), tetraborate (e.g., sodium tetraborate decahydrate) or mixtures thereof.

Boron salts like sodium metaborate and sodium tetraborate are commercially available from Borax and Societa Chimica Larderello under the trade name sodium metaborate® and Borax®.

Suitable pH buffers for use herein in acidic condition include organic acids and mixtures thereof. Suitable organic acids for use herein include monocarboxylic acids, dicarboxylic acids and tricarboxylic acids or mixtures thereof. Preferred organic acids for use herein include acetic acid, citric acid, malonic acid, maleic acid, malic acid, lactic acid, glutaric acid, glutamic acid, aspartic acid, methyl succinic acid, succinic acid or mixtures thereof. Particularly preferred herein are the citric acid and succinic acid or mixtures thereof.

Citric acid is commercially available as an aqueous solution from Jungbunzlauer under the trade name Citric acid®.

Typically, the compositions according to the present invention may comprise up to 15% by weight of the total composition of a pH buffer, or mixtures thereof, preferably from 0.001% to 10%, more preferably from 0.001% to 5% and most preferably from 0.005% to 3%.

Thickening Agent

The composition of the present invention may preferably comprise a thickening agent. A thickening agent is an ingredient which is specifically added to the composition of the present invention to increase the viscosity of the composition.

Suitable thickening agents are those known in the art. Examples of thickening agents include gum-type polymers (e.g. xanthan gum), polyvinyl alcohol and derivatives thereof, cellulose and derivatives thereof and polycarboxylate polymers.

In a particularly preferred embodiment of the present invention the thickening agent comprises a gum-type polymer or a polycarboxylate polymer. Particularly preferred examples of these thickening agents are xanthan gum and cross-linked polycarboxylate polymer respectively.

The gum-type polymer may be selected from the group consisting of polysaccharide hydrocolloids, xanthan gum, guar gum, succinoglucan gum, Cellulose, derivatives of any of the above and mixtures thereof. In a preferred aspect of the present invention the gum-type polymer is a xanthan gum or derivative thereof.

The polycarboxylate polymer can be a homo or copolymer of monomer units selected from acrylic acid, methacrylic acid, maleic acid, malic acid, maleic anhydride. Preferred polycarboxylate polymers are carbopol from BF Goodrich. Suitable polymers have molecular weight in the range of from 10000 to 100,000,000 most preferably 1000000 to 10,000,000.

Radical Scavengers

The compositions described herein may comprise a radical scavenger or a mixture thereof. Suitable radical scavengers for use herein include the well-known substituted mono and dihydroxy benzenes and their analogs, alkyl and aryl carboxylates and mixtures thereof. Preferred such radical scavengers for use herein include di-tert-butyl hydroxy toluene (BHT), hydroquinone, di-tert-butyl hydroquinone, mono-tert-butyl hydroquinone, tert-butyl-hydroxy anysole, benzoic acid, toluic acid, catechol, t-butyl catechol, benzylamine, 1,1,3-tris(2-methyl-4-hydroxy-5-t-butylphenyl) butane, n-propyl-gallate or mixtures thereof and highly preferred is di-tert-butyl hydroxy toluene. Such radical scavengers like N-propyl-gallate may be commercially available from Nipa Laboratories under the trade name Nipanox S1®.

Radical scavengers when used, are typically present herein in amounts up to 10% by weight of the total composition and preferably from 0.001% to 0.5% by weight.

Soil Suspending Polymer

The compositions may further comprise a soil suspending polymer, for example a polyamine soil suspending polymer or mixtures thereof, as optional ingredient. Any soil suspending polyamine polymer known to those skilled in the art may be used herein. Particularly suitable polyamine polymers for use herein are polyalkoxylated polyamines. Such materials can conveniently be represented as molecules of the empirical structures with repeating units:

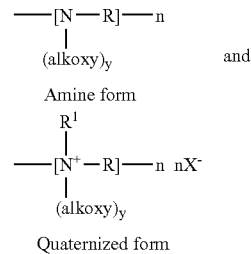

wherein R is a hydrocarbyl group, usually of 2-6 carbon atoms; $R^1$ may be a $C_1$-$C_{20}$ hydrocarbon; the alkoxy groups are ethoxy, propoxy, and the like, and y is 2-30, most preferably from 10-20; n is an integer of at least 2, preferably from 2-20, most preferably 3-5; and $X^-$ is an anion such as halide or methylsulfate, resulting from the quaternization reaction.

The most highly preferred polyamines for use herein are the so-called ethoxylated polyethylene amines, i.e., the polymerized reaction product of ethylene oxide with ethyleneimine, having the general formula:

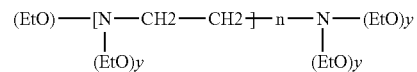

when y=2-30. Particularly preferred for use herein is an ethoxylated polyethylene amine, in particular ethoxylated tetraethylenepentamine, and quaternized ethoxylated hexamethylene diamine.

Perfumes

Suitable perfumes for use herein include materials which provide an olfactory aesthetic benefit and/or cover any "chemical" odour that the product may have. The main function of a small fraction of the highly volatile, low boiling (having low boiling points), perfume components in these perfumes is to improve the fragrance odor of the product itself, rather than impacting on the subsequent odor of the surface being cleaned. However, some of the less volatile, high boiling perfume ingredients provide a fresh and clean impression to the surfaces, and it is desirable that these ingredients be deposited and present on the dry surface. Perfume ingredients can be readily solubilized in the compositions, for instance by the amphoteric surfactant. The perfume ingredients and compositions suitable to be used herein are the conventional ones known in the art. Selection of any perfume component, or amount of perfume, is based solely on aesthetic considerations.

Suitable perfume compounds and compositions can be found in the art including U.S. Pat. Nos.: U.S. Pat. No. 4,145,184, Brain and Cummins, issued Mar. 20, 1979; U.S. Pat. No. 4,209,417, Whyte, issued Jun. 24, 1980; U.S. Pat. No. 4,515,705, Moeddel, issued May 7, 1985; and U.S. Pat. No. 4,152,272, Young, issued May 1, 1979, all of said patents being incorporated herein by reference. In general, the degree of substantivity of a perfume is roughly proportional to the percentages of substantive perfume material used. Relatively substantive perfumes contain at least about 1%, preferably at least about 10%, substantive perfume materials. Substantive perfume materials are those odorous compounds that deposit on surfaces via the cleaning process and are detectable by people with normal olfactory acuity. Such materials typically have vapour pressures lower than that of the average perfume material. Also, they typically have molecular weights of about 200 and above, and are detectable at levels below those of the average perfume material. Perfume ingredients useful herein, along with their odor character, and their physical and chemical properties, such as boiling point and molecular weight, are given in "Perfume and Flavor Chemicals (Aroma Chemicals)," Steffen Arctander, published by the author, 1969, incorporated herein by reference.

Examples of the highly volatile, low boiling, perfume ingredients are: anethole, benzaldehyde, benzyl acetate, benzyl alcohol, benzyl formate, iso-bornyl acetate, camphene, ciscitral (neral), citronellal, citronellol, citronellyl acetate, para-cymene, decanal, dihydrolinalool, dihydromyrcenol, dimethyl phenyl carbinol, eucaliptol, geranial, geraniol, geranyl acetate, geranyl nitrile, cis-3-hexenyl acetate, hydroxycitronellal, d-limonene, linalool, linalool oxide, linalyl acetate, linalyl propionate, methyl anthranilate, alpha-methyl ionone, methyl nonyl acetaldehyde, methyl phenyl carbinyl acetate, laevo-menthyl acetate, menthone, iso-menthone, mycrene, myrcenyl acetate, myrcenol, nerol, neryl acetate, nonyl acetate, phenyl ethyl alcohol, alpha-pinene, beta-pinene, gamma-terpinene, alpha-terpineol, beta-terpineol, terpinyl acetate, and vertenex (para-tertiary-butyl cyclohexyl acetate). Some natural oils also contain large percentages of highly volatile perfume ingredients. For example, lavandin contains as major components : linalool; linalyl acetate; geraniol; and citronellol. Lemon oil and orange terpenes both contain about 95% of d-limonene.

Examples of moderately volatile perfume ingredients are : amyl cinnamic aldehyde, iso-amyl salicylate, beta-caryophyllene, cedrene, cinnamic alcohol, coumarin, dimethyl benzyl carbinyl acetate, ethyl vanillin, eugenol, iso-eugenol, flor acetate, heliotropine, 3-cis-hexenyl salicylate, hexyl salicylate, lilial (para-tertiarybutyl-alpha-methyl hydrocinnamic aldehyde), gamma-methyl ionone, nerolidol, patchouli alcohol, phenyl hexanol, beta-selinene, trichloromethyl phenyl carbinyl acetate, triethyl citrate, vanillin, and veratraldehyde. Cedarwood terpenes are composed mainly of alpha-cedrene, beta-cedrene, and other C15H24 sesquiterpenes.

Examples of the less volatile, high boiling, perfume ingredients are: benzophenone, benzyl salicylate, ethylene brassylate, galaxolide (1,3,4,6,7,8-hexahydro-4,6,6,7,8,8-hexamethyl-cyclopenta-gama-2-benzopyran), hexyl cinnamic aldehyde, lyral (4-(4-hydroxy-4-methyl pentyl)-3-cyclohexene-10-carboxaldehyde), methyl cedrylone, methyl dihydro jasmonate, methyl-beta-naphthyl ketone, musk indanone, musk ketone, musk tibetene, and phenylethyl phenyl acetate.

Selection of any particular perfume ingredient is primarily dictated by aesthetic considerations.

The compositions herein may comprise a perfume ingredient, or mixtures thereof, in amounts up to 5.0% by weight of the total composition, preferably in amounts of 0.0005% to 1.5%.

Minors

Colourants including well known dyes and pigments may be added to the composition in minor amounts.

Other preferred although minor components include disinfectants, brighteners, UV protectants, corrosion inhibitors and preservatives. By preservatives it is meant any compound that can be stably added to the composition that kills or at least inactivates microbes, for example bacteria and fungae. Any suitable preservative currently available on the market may be incorporated herein see for example those listed in the journal HAPPI May 1999 edition p78-94. Particularly preferred preservatives are 1,2-Benzisothiazolin-3-one available from Avecia under the trade name Proxel GXL, phenoxyethanol available from BASF under the trade name ProtectolPP or gluteraldehyde available from BASF under the trade name Protectol GDA Form of the Composition The compositions of the present invention may be in any form, for example, liquid, gel, foam, particulate or tablet.

Where the composition of the present invention is a liquid it may be aqueous or non-aqueous, dilute or concentrated. Where the composition is aqueous it preferably comprises from 1% to 99.9% water, more preferably from 50% to 99.8%, most preferably from 80% to 99.7% water. As mentioned it is alternatively envisaged that the composition may be non-aqueous. By non-aqueous it is meant that the composition is substantially free from water. More precisely it is meant that the compositions does not contain any expressly added water and thus the only water that is present in the composition is present as water of crystallization for example in combination with a raw material.

Wherein the composition is in solid form, e.g. particulate or tablet, it is preferably dissolved in water prior to use.

Packaging Form of the Compositions

The compositions herein may be packaged in a variety of suitable packaging known to those skilled in the art, depending on the form of the composition. The liquid compositions are preferably packaged in conventional bottles that do not chemical react with the composition being stored. The bottles are preferably made of plastic.

In one particularly preferred embodiment, the composition may be packaged in spray dispensing containers. Such containers are usually made of synthetic organic polymeric plastic materials. The spraying device of the container may be manually or electrically powered. Manually operated spraying devices include trigger-operated spray dispenser or pump-operated spray dispenser. Suitable spray-type dispensers to be used according to the present invention include manually operated foam trigger-type dispensers sold for example by Specialty Packaging Products, Inc. or Continental Sprayers, Inc. These types of dispensers are disclosed, for instance, in U.S. Pat. No. 4,701,311 to Dunnining et al. and U.S. Pat. No. 4,646,973 and U.S. Pat. No. 4,538,745 both to Focarracci. Particularly preferred to be used herein are spray-type dispensers such as T 8500® commercially available from Continental Spray International or T 8100® commercially available from Canyon, Northern Ireland. In such a dispenser the liquid composition is divided in fine liquid droplets resulting in a spray that is directed onto the surface to be treated. Indeed, in such a spray-type dispenser the composition contained in the body of said dispenser is directed through the spray-type dispenser head via energy communicated to a pumping mechanism by the user as said user activates said pumping mechanism. More particularly, in said spray-type dispenser head the composition is forced against an obstacle, e.g. a grid or a cone or the like, thereby providing shocks to help atomise the liquid composition, i.e. to help the formation of liquid droplets.

Preferred spray dispensers herein are electrically powered spray dispensers. An example of a suitable spray dispenser is a container wherein the means for delivering the composition comprises an electrically driven pump and a spray arm. Said spray arm is either extended or extendible and has at least one aperture so that in operation, the composition is pumped by said electrically driven pump from the container, through the spray arm to the aperture from which it is dispensed. It is preferred that the spray arm communicates with the container by means of a flexible connector. The spray arm may have at least one aperture located along its length. The spray arm makes it easier to control where the composition is sprayed and therefore, the accuracy with which the composition is applied is increased. The electrically driven pump may be, for example, a gear pump, an impeller pump, a piston pump, a screw pump, a peristaltic pump, a diaphragm pump, or any other miniature pump. In a highly preferred embodiment of the electrically driven pump for use herein the pump is a gear pump with a typical speed between 6000 rpm and 12000 rpm. The electrically driven pump is driven by a means such as an electric motor which typically produces a torque between 1 and 20 mN.m. The electric motor must in turn be provided with a power source. The power source may be either mains electricity (optionally via transformer), or it may be a throw-away battery or rechargeable battery. The spray arm may be rigidly extended. However such a spray arm can be difficult to store, and the spray arm is preferably extensible either by means of telescopic or foldable configuration.

In a preferred embodiment of the present invention, the cleaning composition is applied to the surface using a spray dispenser which is specifically designed to attach to a hose, for example conventional garden hose. Such spray dispensers are commonly referred to in the trade as Venturi or hose-end systems. FIG. 1 shows one example of such a sprayer 20. As shown in FIG. 1. the sprayer 20 comprises a container 22 in which is stored the cleaning composition 24, and a sprayer head 26 which serves as a cover for the container. The sprayer head 26 also comprises an adapter 28 for attaching the garden hose 30. The sprayer head 26 includes an aperture over which water from the garden hose 30 passes to mix with the cleaning composition 24 from the container 22. As water passes over the aperture, a siphoning or vacuum effect is created by virtue of the velocity of the water passing over the aperture, drawing cleaning composition 24 from the container 22 and into the passing water. In a preferred embodiment of the present process, the spray dispenser used encompasses a switch or valve system allowing the user to not only spray cleaning composition, but also spray water and/or purified rinse water to rinse the car. In a particularly preferred embodiment, the spray dispenser also comprises a purifying device 32. Water is thus channeled though the purifying device 32 to prepare the water for the final rinse of purified rinse water.

EXAMPLES

The present invention will be further illustrated by the following examples. All levels are expressed in weight percent of the total composition.

Example 1

| | I | II | III | IV | V |
|---|---|---|---|---|---|
| C12-14 alkyl ethoxy sulphate (EO0.6) | 0.8 | — | — | — | 1 |
| C12-15 alkyl sulphate | 0.8 | — | 5 | — | — |
| C12 LAS | — | 1 | — | 1 | 5 |
| Dioctyl sulphosuccinate | — | — | — | 1 | — |
| C10(EO8) | 0.08 | — | — | — | — |
| C12-14(EO5) | — | 0.08 | — | 0.2 | — |
| C11(EO5) | — | — | — | 0.2 | — |
| C12-14 dimethylaminoxide | 0.2 | — | 0.15 | — | — |
| Na cumene sulphonate | — | 1.2 | — | — | — |
| PVP-VI | 1 | 2 | — | 0.5 | 1 |
| Polystyrenesulphonate | — | — | 2 | — | 1 |
| PVNO | 1 | | | | |
| Ethoxylated tetraethylene pentaimine | 0.05 | — | — | 0.08 | 0.08 |
| Ethoxylated hexa methylene diamine quat | — | 0.05 | 0.08 | — | — |
| Poly(ehtyleneimine) ethoxylate | 0.05 | — | 0.02 | — | — |
| SSP | — | 0.05 | — | — | 0.05 |
| HEDP | 0.5 | 2 | 2 | — | 1 |
| Nitriloacetic acid | — | — | — | 1 | — |
| Diethylene triamine pentaacetate | — | — | — | 1 | — |
| Citric acid | 0.5 | — | — | — | — |
| Butyl diglycol ether | — | 1 | — | — | — |
| N Butoxy propoxy propanol | — | 0.5 | — | — | — |
| gluteraldehyde | 0.035 | 0.025 | 0.025 | 0.025 | 0.035 |
| phenoxyethanol | — | — | 0.2 | 0.2 | — |
| NaOH till correct pH | pH 7.5 | pH 7.5 | pH 7.5 | — | pH 7.5 |
| Acetic acid till correct pH | — | — | — | pH 7.5 | — |
| Water to balance | | | | | |

SSP is a poly ethylene Amine MW 3000 propoxylated to a degree of 3 and ethoxylated to a degree of 27.

Example 2

| | VI | VII | VIII | IX | X |
|---|---|---|---|---|---|
| PVNO | 0.1 | 0.08 | 0.05 | 0.08 | 0.1 |
| C12-14 Alkyl sulphate | 0.2 | — | — | — | — |
| APG | — | 0.3 | — | — | 0.15 |
| Ethanol | — | — | 3 | 5 | 4 |
| Perfume | 0.01 | 0.015 | 0.01 | 0.01 | 0.02 |
| Preservative | 0.01 | — | — | 0.01 | 0.01 |
| pH | 7 | 5 | 5 | 6 | 8 |

PVPVI is N-vinylimidazole N-vinylpyrrolidone supplied by BASF under the trade name Luvitec VP155K18P.
PVNO is polyvinyl pyridine N-oxide supplied by Reilly having molecular weight 20,000.
APG is alkyl polyglucoside supplied by Henkel under the tradename Plantaren 2000.
Cremophor EL is ethoxylated castor oil supplied from Sigma.

Example 3

|  | XI | XII | XIII | XIV | XV |
|---|---|---|---|---|---|
| C12-14 alkyl ethoxy sulphate (EO0.6) | 11 | — | 11 | — | 11 |
| C12-15 alkyl sulphate | 11 | — | — | 11 | — |
| C12 LAS | — | 11 | — | 11 | 11 |
| C10(EO8) | 1.3 | — | 1.3 | — | — |
| C12-14(EO5) | — | 1.3 | — | 1.3 | — |
| C12-14 dimethylaminoxide | 2.8 | — | 2.8 | — | — |
| PVP-VI | 6 | 9 | 6 | 3 | — |
| PVNO | 3 | — | 6 | 6 | 9 |
| Laponite | — | 2 | — | — | 2 |
| Gluteraldehyde | 0.035 | 0.035 | 0.035 | 0.035 | 0.035 |
| NaOH or H2SO4 till correct pH | pH 7.5 | pH 7.5 | pH 7.5 | pH 7.5 | pH 7.5 |
| Water to balance | | | | | |

What is claimed is:

1. A process for cleaning a surface, said process comprising the steps of:
   (a) contacting the surface with an aqueous cleaning composition having a pH of less than 9, said cleaning composition comprising:
      (i) a polymer which renders the surface hydrophulic, said polymer selected from the group consisting of polyvinyl pyrrolidone polymers, polyvinyl pyridine N-oxide polymers, and mixtures thereof; and
      (ii) a nanoparticle clay mineral; and
   (b) then rinsing the surface with purified rinse water which is sprayed from a hand-held spray dispenser attached to a hose in communication with a source of tap water, said hand-held spray dispenser comprising a water purifying device which comprises an ion exchange resin, wherein the purified rinse water is prepared by the tap water passing through said water purifying device.

2. The process of claim 1, wherein the surface is a soiled surface, further comprising a step of pre-wetting the soiled surface prior to contacting the soiled surface with the cleaning composition.

3. The process of claim 1 further comprising a step of rinsing the surface with the tap water between the step of contacting the surface with the cleaning composition and the step of rinsing the surface with purified rinse water.

4. The process of claim 1 wherein the surface is selected from the group consisting of: glass, plastic, metal, chrome metal, varnished or sealed surfaces, and an exterior surface of a vehicle.

5. The process of claim 1 wherein the cleaning composition modifies the surface to render it hydrophilic, providing a contact angle between water and the surface of less than 80°.

6. The process of claim 5 wherein the cleaning composition modifies the surface to render it hydrophilic, providing a contact angle between water and the surface of less than 40°.

7. The process of claim 6 wherein the cleaning composition modifies the surface to render it hydrophilic, providing a contact angle between water and the surface of less than 20°.

8. The process of claim 1 wherein the polymer is selected from the group consisting of: N-vinylimidazole N-vinylpyrrolidone (PVPVT) polymers, polyvinyl pyridine N-oxide (PVNO) polymers, quaternized vinylpyrrolidone/dialkylaminoalkyl acrylate or methacrylate copolymers and mixtures thereof.

9. The process of claim 1 wherein the cleaning composition additionally comprises one or more components selected from the group consisting of surfactants, chelants, enzymes, builders, bleaching agents, soil release agents, disinfectants, brighteners, UV protectants, corrosion inhibitors and mixtures thereof.

10. The process of claim 1 wherein the ion exchange resin is selected from the group consisting of: a single ion exchange resin, a mixture of ion exchange resins or layers of such resins, and a combination of mixed and layered ion exchange resins.

11. The process of claim 1 wherein the water purifying device comprises at least three layers of ion exchange resin.

12. The process of claim 1 wherein the ion exchange resin of the water purifying device produces a visual indication of depletion of purifying capacity of the ion exchange resin.

13. The process of claim 1 wherein the cleaning composition is sprayed from a hand-held spray dispenser onto the surface.

14. The process of claim 13 wherein the cleaning composition and the purified rinse water are sprayed from the same hand-held spray dispenser.

15. The process of claim 14 wherein said hand-held spray dispenser further comprises a container for storing the cleaning composition.

16. The process of claim 1 wherein said cleaning composition further comprises a nanionic surfactant.

17. The process of claim 1 wherein said cleaning composition further comprises one type of surfactant, wherein said one type of surfactant consists essentially of one or more nonionic surfactants.

18. The process of claim 17 wherein said one or mare nonionic surfactants comprise alkyl polysaceharide surfactants.

19. The process of claim 1 wherein after the surface is rinsed with purified water, the surface remains hydrophilic with a contact angle between water and the surface of less than 80° following at least one additional rinse.

20. The process of claim 1 wherein after the surface is rinsed with purified water, the surface remains hydrophilic with a contact angle between water and the surface of less than 80° following at least three additional rinses.

21. The process of claim 1 wherein after the surface is rinsed with purified water, the surface remains hydrophilic with a contact angle between water and the surface of less than 80° following at least five additional rinses.

22. The process of claim 1 wherein said water purifying device comprises at least a strong acid cation ion exchange resin and a weak base anion ion exchange resin.

23. The process of claim 1 wherein said nanoparticle clay mineral has a particle size from about 20 nm to about 30 nm.

24. The process of claim 23 wherein said nanoparticle clay mineral is a hydrous lithium magnesium silicate clay mineral.

25. The process of claim 1 wherein said ion exchange resin comprises resin beads having a diameter of less than about 1.0 mm.

26. The process of claim 25 wherein said ion exchange resin comprises resin beads having a diameter of less than about 0.4 mm.

27. The process of claim 1 wherein said water purifying device comprises an ion exchange resin having a volume capacity of no greater than 100 in$^3$.

28. A process for cleaning an external surface of a vehicle, said process comprising the steps of:
  (a) providing a hand-held spray dispenser attached to a hose in communication with a source of tap water, said hand-held spray dispenser comprising:
    (i) a container for storing a cleaning composition, said cleaning composition comprising a polymer having at least one hydrophobic or cationic moiety and at least one hydrophobic moiety,
      wherein said hydrophobic moiety is selected from the group consisting of aromatic groups, $C_8$-$C_{18}$ linear or branched carbon chains, vinyl imidazole groups, and propoxy groups,
      wherein said cationic moiety is selected from any group that is positively charged or has a positive dipole, and
      wherein said hydrophilic moiety is selected from the group consisting of vinyl pyrrolidone groups, acrylic acid groups, methacrylic acid groups, maleic acid groups, and ethoxy groups;
    (ii) a water purifying device comprising an ion exchange resin, wherein purified rinse water is prepared by to tap water passing trough said water purifying device; and
    (iii) a system enabling a user to switch between spraying the cleaning composition, spraying the purified rinse water, and spraying the tap water, all from the amine band-held spray dispenser;
  (b) spraying the external surface of the vehicle with the cleaning composition from the hand-held spray dispenser; and
  (c) then rinsing the external surface of the vehicle with the purified rinse water from the hand-held spray dispenser.

29. The process of claim 28 further comprising a step of rinsing the external surface of the vehicle with the tap water between the step of spraying the external surface of the vehicle with the cleaning composition and the step of rinsing the external surface of the vehicle with the purified rinse water.

30. The process of claim 28 wherein said polymer is selected from the group consisting of polyvinyl pyrrolidone polymers, polyvinyl pyridine N-oxide polymers, and mixtures thereof.

31. The process of claim 28 wherein said polymer is selected from the group consisting of N-vinylimidazole N-vinylpyrrolidone (PVPVI) polymers, polyvinyl pyridine N-oxide (PVNO) polymers, quaternized vinylpyrrolidone/dialkylaminoalkyl acrylate or methacrylate copolymers and mixtures thereof.

32. The process of claim 28 wherein the cleaning composition further comprises a nanoparticle clay mineral.

33. The process of claim 32 wherein said nanoparticle clay mineral has a particle size from about 20 nm to about 30 nm.

34. The process of claim 28 wherein the cleaning composition stored in the container is mixed with tap water within the hand-held spray dispenser, such that the cleaning composition further comprises tap water prior to the cleaning composition being sprayed on the external surface of the vehicle.

* * * * *